(12) United States Patent
Keene et al.

(10) Patent No.: US 12,340,669 B2
(45) Date of Patent: Jun. 24, 2025

(54) SECURITY SYSTEM WITH FERROMAGNETIC SENSING

(71) Applicant: Metrasens Limited, Worcestershire (GB)

(72) Inventors: Mark Nicholas Keene, Worcestershire (GB); Simon Wray Goodyear, Worcestershire (GB)

(73) Assignee: Metrasens Limited, Worcestershire (GB)

( * ) Notice: Subject to any disclaimer, the term of this patent is extended or adjusted under 35 U.S.C. 154(b) by 0 days.

(21) Appl. No.: 17/793,491

(22) PCT Filed: Jan. 29, 2021

(86) PCT No.: PCT/GB2021/050213
§ 371 (c)(1),
(2) Date: Jul. 18, 2022

(87) PCT Pub. No.: WO2021/152326
PCT Pub. Date: Aug. 5, 2021

(65) Prior Publication Data
US 2023/0071428 A1   Mar. 9, 2023

(30) Foreign Application Priority Data
Jan. 30, 2020   (GB) ..................................... 2001272

(51) Int. Cl.
*G08B 13/24*   (2006.01)
*G08B 13/196*   (2006.01)

(52) U.S. Cl.
CPC ........... *G08B 13/24* (2013.01); *G08B 13/196* (2013.01)

(58) Field of Classification Search
CPC ......... G08B 13/24; G08B 13/196; G01V 3/08
See application file for complete search history.

(56) References Cited

U.S. PATENT DOCUMENTS 6,150,810 A    11/2000   Roybal
6,362,739 B1   3/2002    Burton
(Continued)

FOREIGN PATENT DOCUMENTS

JP    H1132322 A    * 2/1992
JP    2010256196 A  * 11/2010
(Continued)

OTHER PUBLICATIONS

International Search Report and Written Opinion mailed on Apr. 22, 2021, in corresponding to International Application No. PCT/GB2021/050213; 14 pages.
(Continued)

*Primary Examiner* — Rufus C Point
(74) *Attorney, Agent, or Firm* — Birch, Stewart, Kolasch & Birch, LLP

(57) ABSTRACT

A security system including a visitor/intruder register element configured to register a visitor/intruder in a detection zone and a passive ferromagnetic detection element configured to indicate a target-sized or larger ferromagnetic object in the detection zone, where the detection zone covers, or is proximate or adjacent to, an entry point of a location to be secured, and where, in use, an end-user alert element is configured to raise an alert when a visitor/intruder is registered by the visitor/intruder register element in the detection zone and a target-sized or larger ferromagnetic object is indicated by the passive ferromagnetic detection element in the detection zone.

19 Claims, 12 Drawing Sheets

(56) References Cited

U.S. PATENT DOCUMENTS

| | | | |
|---|---|---|---|
| 10,165,228 B2* | 12/2018 | Stephanson | G01D 18/00 |
| 2004/0189293 A1 | 9/2004 | Czipott et al. | |
| 2006/0197523 A1 | 9/2006 | Palecki et al. | |
| 2008/0231443 A1 | 9/2008 | Kotter et al. | |
| 2010/0156407 A1* | 6/2010 | Lausch | G01V 8/10 |
| | | | 706/46 |
| 2013/0163619 A1* | 6/2013 | Stephanson | H04Q 9/00 |
| | | | 370/537 |
| 2013/0307533 A1 | 11/2013 | Keene et al. | |
| 2015/0279189 A1* | 10/2015 | Keene | G01V 3/08 |
| | | | 340/540 |

FOREIGN PATENT DOCUMENTS

| | | | | |
|---|---|---|---|---|
| WO | 2004044620 A1 | 5/2004 | | |
| WO | 2012022971 A2 | 2/2012 | | |
| WO | WO-2012146247 A1 * | 11/2012 | | E05G 1/024 |
| WO | 2014064429 A2 | 5/2014 | | |
| WO | 2015071672 A2 | 5/2015 | | |
| WO | 2016097724 A1 | 6/2016 | | |

OTHER PUBLICATIONS

Search Report dated Jun. 3, 2020, in corresponding to GB Application No. 2001272.0; 2 pages.

* cited by examiner

SECURITY SYSTEM WITH FERROMAGNETIC SENSING

FIELD

The invention relates to a security system. In particular, though not exclusively, the invention relates to an early warning system for securing an entry point of a location to be secured, and method and uses thereof.

BACKGROUND

Conventional security systems exist for protecting homes, buildings and other locations from intrusion and theft. A conventional security system might contain door/window switches connected to a central alarm hub. When such door/windows are unexpectedly opened, the alarm hub activates an alarm. Other conventional security systems may contain PIR switches or CCTV monitoring systems connected to a central alarm hub. When such CCTV/PIR systems register movement, the alarm hub activates an alarm. However, these conventional security systems have limitations. Door/window switches and indoor CCTV/PIR systems only trigger when an intruder has gained entry to the building. In this situation, anyone already inside the building has little time to react and is at personal risk. To be effective, outdoor CCTV surveillance systems must be monitored. However, people are not always available to monitor these cameras and/or their attention may waiver. If unmonitored, they often give too many 'false positives'. This is because there are often legitimate reasons for people and objects to be moving outside, e.g. mail courier delivering mail to a household. As such, outdoor CCTV systems tend to be used in post-crime analysis, rather than in active crime interception. Outdoor CCTV is also adversely affected by environmental conditions, e.g. fog, snow, and even heavy rain. PIR sensors suffer similar problems. PIR sensors are sometimes used to trigger outdoor floodlights as a prowler deterrent. However, pets and other animals can also trigger the PIR sensors and hence the floodlights, giving multiple false positives. Too many false positives are problematic as they can lead to a lack of overall diligence, cause unnecessary worry and unduly upset neighbors. Remote locations like farm buildings are also difficult to protect from intruders. These buildings are, or the entrances to such buildings, may be out of sight or distant. These buildings are therefore vulnerable to break-ins, where valuable tools, machinery, vehicle or even livestock may be stolen. There remains a need in the art for improve security systems.

SUMMARY

In a first aspect of the invention, there is provided a security system comprising
a visitor/intruder register means configured to register a visitor/intruder in a detection zone and a passive ferromagnetic detection means configured to indicate a target-sized or larger ferromagnetic object in the detection zone, wherein the detection zone covers, or is proximate or adjacent to an entry point of a location to be secured, and wherein in use, an end-user alert means is configured to raise an alert when a visitor/intruder is registered by the visitor/intruder register means in the detection zone and a target-sized or larger ferromagnetic object is indicated by the passive ferromagnetic detection means in the detection zone.

In a second aspect of the invention, there is provided a security system comprising:
(i) a passive ferromagnetic detection means arranged to measure an ambient magnetic field within a ferromagnetic detection zone and to produce a measurement signal;
(ii) a ferromagnetic assessment means arranged in communication with the passive ferromagnetic detection means and configured to receive the measurement signal and configured to identify temporal variations in the measurement signals and to produce a ferromagnetic assessment output;
(iii) an end-user alert means arranged in communication with the ferromagnetic assessment means and configured to receive the ferromagnetic assessment output and configured to raise an alert when the ferromagnetic assessment output indicates the presence of a target-sized or larger ferromagnetic object in the ferromagnetic detection zone; and
wherein the ferromagnetic detection zone covers, or is proximate or adjacent to an entry point of a location to be secured.

The present invention provides several benefits, some of which are outlined further below.

Visitor/intruder threat assessment—when a person is detected in the vicinity of the entry/access point of a building (e.g. like the entrance to a domestic dwelling), the invention may be arranged to provide an assessment of the potential threat level posed by the person. The passive ferromagnetic detection means of the invention is capable of detecting the relative amount of ferromagnetic materials on the person. As a general rule, the more ferromagnetic material (e.g. iron) present in/on an object, the greater the magnetic field generated by the object when it is moving. This generated magnetic field interacts and changes the surrounding local (ambient) magnetic field. As such, a person carrying a gun or rifle (i.e. an iron rich object), will generate a larger change in the local magnetic field than the same person without the gun. All things being equal, the bigger the change detected in the local magnetic field, the bigger the ferromagnetic object. The passive ferromagnetic detection means in essence works by measuring the change in the local magnetic field caused by the ferromagnetic object. As such, the ferromagnetic detection means is capable of giving a relative estimate of the ferromagnetic 'load' the person is carrying. If this 'load' is unusually high, the invention may be set up to issue a warning. A person within the location (e.g. a homeowner) is then enabled to make a safety assessment based on the warning provided. For example, if there is a good reason for the visitor to be carrying a high 'load' (such as a workman with a steel ladder), then the visitor may be granted entry to the location. However, if the person is a criminal carrying a concealed weapon, but posing as an innocent person (e.g. a delivery person), then the informed homeowner is enabled to take a prudent security action (e.g. call the police) and bar entry. If there is any uncertainty, the homeowner could investigate/interrogate the visitor (e.g. via an intercom on a smart doorbell device) to see if there is a legitimate reason for allowing the visitor into the dwelling.

Reduced false positives—the invention has the capability to discriminate between a human being and pets/wild animals/heavy precipitation etc. Human beings tend to carry a plethora of ferromagnetic items on them, e.g. cellphone (i.e. smart phone, mobile phone), keys etc., and so will have a reasonable ferromagnetic 'load'. In the same way, pets and wild animals do not. Therefore, a conventional PIR device position at a remote window could be unduly triggered by a cat or raccoon visiting the windowsill. Similarly, a conventional PIR system positioned in a garage could register the movement of vermin and trigger an alarm. Such false positives triggering and alarm cause undue worry and annoyance. However, unlike a conventional PIR system, the invention would not trigger an alert/warning/alarm unless the object detected is also carrying a reasonable ferromagnetic/magnetic 'load'. This provides the benefit of eliminating false positives caused by animal movement or even bad weather. Therefore, the invention may be configured to detect nefarious human movement in a prohibited place and/or at a prohibited time (e.g. at night). If the person is carrying a weapon or crowbar, the detected 'load' will be greater, and therefore be even more suspicious.

Remote location protection—remote locations like farm outbuildings are particularly vulnerable to break-ins and theft. It is not uncommon for farmers to discover that machinery and equipment has been stolen from storage areas and damage done. Aside from the inconvenience and the lost work time, this leads to increased insurance premiums, hence increased working costs. Even if a conventional alarm were used, the location may be too remote to mount an effective response in due time. Therefore, there is a benefit in spotting unexpected human activity/threats as soon as possible. For example, there is a benefit in spotting an unexpected vehicle or person passing through an access point leading to the farm or farm buildings. For example, these may be people in a vehicle intent on stealing livestock. The detection of the ferromagnetic 'load', gives valuable early warning to a farmer working away from the location of that unexpected human activity. This early warning enables the farmer to prepare a suitable response.

Unexpected vehicle movement—during the working day, it may be impractical to use a conventional alarm to protect a storage area, as people and machinery might be using the location intermittently. However, unexpected movement of a large metal object (like a tractor, plow or caravan) out of an in use farm storage area, gives a farmer early warning of this vehicle movement. The alert indicating that there is an ongoing attempt to steal the farm's equipment. This enables an appropriate response to be mounted, such as phoning the police or other farmhands, and/or blockading the exits to the farm. In addition, for example, remotely accessed CCTV allows the farmer to check if the machinery is merely being used unexpectedly by an authorized farmhand. In a related fashion, heavy equipment is sometimes used to rip out and steal cash machines (ATMs) mounted through external walls of buildings like banks. The invention may be set up (tuned) to ignore people using the ATM, cars moving on a nearby road; but to trigger a warning/alarm when a very large ferromagnetic object (like an excavator, digger or crane) approaches or unduly encroaches on the ATM. At nighttime, detection of a very large ferromagnetic object may be even more suspicious.

The above-mentioned benefits with illustrative embodiments/examples are non-limiting. Other ways of using/deploying the invention are considered within the scope of the invention.

In a third aspect of the invention, there is provided a security system comprising:
 (i) a passive ferromagnetic detection means arranged to measure an ambient magnetic field within a ferromagnetic detection zone and to produce a measurement signal;
 (ii) a ferromagnetic assessment means arranged in communication with the passive ferromagnetic detection means and configured to receive the measurement signal and configured to identify temporal variations in the measurement signals and to produce a ferromagnetic assessment output;
 (iii) an end-user alert means arranged in communication with the ferromagnetic assessment means and configured to receive the ferromagnetic assessment output;
 (iv) a visitor/intruder register means arranged to register the presence of a visitor/intruder in an object detection zone and to produce a register signal;
 (v) a register assessment means arranged in communication with the visitor/intruder register means and configured to receive the register signal and to process the register signal and to produce a visitor/intruder assessment output,
  and wherein the end-user alert means is arranged in communication with the register assessment means and is configured to receive the visitor/intruder assessment output;
 and wherein in use, the end-user alert means is configured to raise an alert when the ferromagnetic assessment output indicates the presence of a target-sized or larger ferromagnetic object in the ferromagnetic detection zone and the visitor/intruder assessment output indicates the presence of a visitor/intruder in the object detection zone.

In an embodiment the passive ferromagnetic detection means and/or the visitor/intruder register means is an Internet of Things (IoT) device, or comprises an IoT device. In an embodiment, the Internet of Things may be a system of computing devices, mechanical and/or digital machines and objects that have the capability to transfer data over a network. In an embodiment, the IoT device may operate without requiring human-to-human or human-to-computer interaction. In an embodiment, the IoT device may be provided with a unique identifier (UID). In an embodiment, the IOT may cover embedded systems, wireless sensor networks, control systems, automation (including home and building automation). In an embodiment, the IOT device may pertain to the concept of the "smart home", covering devices and appliances (such as lighting fixtures, thermostats, home security systems and cameras, and other home appliances) that support one or more common ecosystems, and can be controlled via devices associated with that ecosystem, such as smartphones. In an embodiment the passive ferromagnetic detection means is an 'Internet of Things' (IoT) device or comprises the IoT device. In an embodiment the visitor/intruder register means is an IoT device or comprises the IoT device. In an embodiment the passive ferromagnetic detection means and visitor/intruder register means is an IoT device or comprises an IoT device. In an embodiment an IoT device comprises the passive ferromagnetic detection means. In an embodiment an IoT device comprises the visitor/intruder register means. In an embodiment an IoT device comprises the passive ferromagnetic detection means and the visitor/intruder register means. The Internet of Things allows many IoT devices to operate in a useful and concerted fashion. For example, in response to an alert from the end-user means of the invention, a series of IoT devices might be triggered, or the live feed from an IOT device is provided to the end-user. For example, in response to the detection of human activity near a remote window, external flood lights might be triggered, or more subtly, internal lighting and speakers might operate in a fashion simulating the activity of a wakened homeowner. Also, CCTV may be instructed to start recording the policed area to gather evidence, and/or to transmit a livestream of images and/or sounds to an end-user device or monitoring station.

In an embodiment the security system comprises one or more of internet router, Bluetooth connection, internet connection, cloud-based server, and means to connect thereto. In an embodiment the system comprises any one of Local, Personal, Home, Neighborhood, or Field Area Network (i.e. LAN, PAN, HAN, NAN and FAN). Networking the invention, parts of the invention, or other linked IoT devices together, provides remote monitoring solutions and/or overall improved security systems. In an embodiment the connection may be wired or wireless. Wired networks are convenient, reliable and fast. Wireless systems offer simplicity and ease of connection/expansion.

In an embodiment the end-user alert means is a piece of hardware. In an embodiment the end-user alert means is software, such as an app or program configured to run on hardware. In an embodiment a remote, portable and/or personal device comprises the end-user alert means. In an embodiment the end-user alert means is hardware such as a circuit board, chip, processor, electronic component/device and/or computer etc. In an embodiment a circuit board, chip, processor and or computer comprises the end-user alert means. In an embodiment the end-user alert means is software, such as an app or program, including an app or program configured to run on a device like a cellphone, tablet or computer. In an embodiment the end-user alert means is software on a device like a cellphone, tablet or computer. In an embodiment the end-user alert means is an app/program/software running on a cellphone, tablet or computer. In an embodiment the end-user alert means is part of a software package, e.g. an app or program running on a cellphone, tablet, computer etc. As such, the end-user means, ferromagnetic assessment means and/or the register assessment means could be physical objects such as hardware (logic components on a circuit board etc.), or a piece of software, that takes and processes information and gives an output. The output might be a digital or analogue signal or data-stream used by other devices, or the information is directly presented to the end-user such as using LED lights, or on a digital display of a cellphone etc.

In an embodiment a remote, portable and/or personal device comprises the ferromagnetic assessment means. In an embodiment a remote, portable and/or personal device comprises the register assessment means. In an embodiment a remote, portable and/or personal device comprises the end-user alert means. In an embodiment a remote, portable and/or personal device comprises two or more of the ferromagnetic assessment means, the register assessment means, and the end-user alert means. In an embodiment the remote, portable and/or personal device comprises the ferromagnetic assessment means, register assessment means and end-user alert means. In some circumstances, the End-user may prefer to use their own personal device to host the end-user alert means as software (and possibly other software applications of the invention), for example on a smartphone. This has several benefits. If the end-user is happy to use a personal device, this permits lower manufacturing cost by not having to manufacture a dedicated piece of hardware to be the end-user alert means device. The end-user also benefits from the option of not having to carry an additional device. Devices like cellphones (i.e. smartphones) are portable and have the benefit of good widespread connectivity to the internet. The system of the invention may employ a dedicated/bespoke end-user alert means as a hardware device, but also allow connection by approved end-user personal devices. In an embodiment the remote, portable and/or personal device is selected from any one of cellphone (smart phone; mobile phone), notepad, tablet, buzzer, speaker, pager, screen, LED display, monitor, console and computer. In an embodiment, the cellphone, notepad, tablet, buzzer, speaker, pager, screen, LED display, monitor, console and computer may be an IoT device, or comprise an IoT device. Other IoT devices or pieces of IoT hardware are also considered. In an embodiment the remote, portable and/or personal device is activated (e.g. turned on, restored from hibernation, or promoted to be actively displayed to the end-user) within the location to be secured, e.g. in response to the detection of a potential threat. In an embodiment, the personal device is selected from any one of a fix monitoring station (such as a display), smart speaker, console, monitor and television. In an embodiment, the display, smart speaker, console, monitor and television may be IoT devices, or comprise an IoT device.

In an embodiment the system screens the visitor/intruder when outdoors (i.e. out-of-doors). The term 'outdoors' includes a location outside; outside the location to be secured. Non-limiting examples include garden, flowerbed, field, crop, walkway, path, road roadside etc. The visitor/intruder may be an known or unknown visitor intent on a nefarious purpose, for example intent on doing harm or robbery; or may be a person posing as a visitor with a legitimate reason for visiting the location such as a delivery person or worker.

In an embodiment the passive ferromagnetic detection means is located on, or adjacent to, the entry/access point of the location to be secured. In an embodiment the visitor/intruder register means is located on, or adjacent to, the entry/access point of the location to be secured. The invention is therefore useful in protecting a location from external threats, for example giving extra time to launch a security response, or simply barring entry to the location. In an embodiment the passive ferromagnetic detection means and/or visitor/intruder register means are located on; proximate to, or adjacent to, the entry point of the location to be secured.

In an embodiment the ferromagnetic detection zone covers, or is on, proximate or adjacent to an entry point of the location to be secured. In an embodiment the visitor/intruder object detection zone covers, or is on, proximate or adjacent to the entry point of a location to be secured. In an embodiment the ferromagnetic detection zone and object detection zone overlap, the overlapping region defining a concurrent detection zone. In some situations, it is prudent to police an area in and around the entry point of a location to be protected to give early warning, e.g. like the path leading up to and around the front door of a domestic dwelling. In other situations, it might be more practical to police only a small area to give a more targeted response, e.g. a windowsill.

In an embodiment the ferromagnetic detection zone extends from indoors to outdoors. In an embodiment the ferromagnetic detection zone extends outdoors to indoors. In an embodiment the ferromagnetic detection zone and/or object detection zone are substantially outdoors. In an embodiment the ferromagnetic detection zone and the object detection zone partially overlap. In an embodiment the ferromagnetic detection zone substantially overlaps with the object detection zone. In an embodiment the ferromagnetic detection zone substantially overlaps with the object detection zone outdoors. In an embodiment the ferromagnetic detection zone is substantially within the object detection zone. In an embodiment the object detection zone substantially overlaps with the ferromagnetic detection zone. In an embodiment the object detection zone substantially overlaps with the ferromagnetic detection zone outdoors. In an embodiment the object detection zone is substantially within the ferromagnetic detection zone. In an embodiment the ferromagnetic detection zone and object detection zone include only the area in which the ferromagnetic detection zone and object detection zone otherwise overlap (e.g. defining a concurrent detection zone). In an embodiment the ferromagnetic detection zone polices the entry point of a location to be secured. In an embodiment the ferromagnetic detection zone polices movement up to and/or through the entry point of a location to be secured. In an embodiment the object detection zone polices the entry point of a location to be secured. In an embodiment the object detection zone polices movement up to and/or through the entry point of a location to be secured.

The invention can be deployed in a plethora of locations, which will be understood by the person skilled in the art. In an embodiment the location to be secured is selected from any one of a domestic home, gated community, outbuilding, room, door, doorway, archway, gate, window, garage, farm (including ranch), farm building, farm outbuilding, animal enclosure, hanger, wall housing an ATM, industrial building or complex of buildings. In an embodiment the location is further selected from educational, religious, judicial, police, boarder/immigration or military establishment. In an embodiment the door, archway, gate, or window faces outdoors; on the exterior of a building. In an embodiment the detection zone (or zones), is located substantially outside of a building, and where the building is the location to be secured. In an embodiment the security system is arranged to police/monitor entry from outdoors to indoors via the entry point of the location to be secured. In an embodiment the passive ferromagnetic detection means is concealed outdoors, non-limiting examples include hidden in garden furniture, garden ornaments, bollard, gateway, under paving slabs, by a path or road entrance, in/around a field or concealed in shrubbery or flowerbeds etc. In an embodiment the entry point of the location to be secured is selected from any one of a door, doorway, archway, gate, tunnel, window, cat flap and chimney. In an embodiment the passive ferromagnetic detection means is located in, on, adjacent, proximate or around a door, archway, gate, window or ATM. In an embodiment the passive ferromagnetic detection means is located in, on, adjacent, proximate or around a window. In an embodiment when the passive ferromagnetic detection means is located in, on, adjacent, proximate or around a window, and wherein the means is tuned to detect human activity (e.g. to detect moving ferromagnetic objects that are around the size of a cellphone and/or set of keys etc.; smaller ferromagnetic objects being ignored). In an embodiment when the passive ferromagnetic detection means is located in, on, adjacent, proximate or around a door, doorway or entrance to a building, the means is tuned to detect threat-sized ferromagnetic objects (e.g. to detect handgun, rifle, assault rifle or suicide bomb vest etc.; smaller ferromagnetic objects being ignored). In an embodiment when the passive ferromagnetic detection means is located in, on, adjacent, proximate or around an ATM, the means is tuned to detect heavy machinery (e.g. the nearby presence of a metal bucket of an excavator etc.; smaller ferromagnetic objects being ignored). In an embodiment the visitor/intruder register means is concealed outdoors, non-limiting examples include hidden in garden furniture, garden ornament, bollard, gateway, under paving slabs, by a path or road entrance, in/around a field or concealed in shrubbery or flowerbeds etc. In an embodiment the visitor/intruder register means is located in, on, adjacent, proximate or around a door, doorway, archway, gate, window or ATM. In an embodiment the visitor/intruder register means is located in, on, adjacent, proximate or around a window. In an embodiment the visitor/intruder register means is located in, on, adjacent, proximate or around a door, doorway or entrance to a building. In an embodiment the passive ferromagnetic detection means and visitor/intruder register means are concealed outdoors. Usefully, the invention permits a covert deployment strategy. In this way visitors/intruders are not aware they are being screened, giving the end-user an advantage. Also, if hidden from sight, the invention, or parts thereof, are less likely to be evaded or tampered with. This also creates a sense of uncertainty in a would-be intruder, and so have a deterrent effect.

In an embodiment the passive ferromagnetic detection means is spaced away from the entry point, in order to minimize the detection of smaller but close ferromagnetic objects, such as ferromagnetic objects smaller than target-sized. It is known in the art that the ferromagnetic signal from a ferromagnetic object decays very rapidly as you move away from the object (i.e. as a cube of the distance). As such, there is a zone very near a ferromagnetic sensor that is especially sensitive. That is, in this zone even objects with a small magnetic moment give large signals. By ensuring there is a 'buffer zone' to prevent objects getting too close to the sensor, this especially sensitive detection zone is excluded (objects cannot enter it). This 'buffer zone' is usefully used to ensure that small ferromagnetic objects very close to the sensor are not mistaken for larger ferromagnetic objects space further away from the sensor.

In an embodiment the target-sized object is selected from any one of: about the size of a knife, handgun, rifle, assault rifle, or suicide bomb vest. In an embodiment the target-sized object is selected from any one of: about the size of a motorbike, car, excavator, tractor, or farm machinery. In an embodiment the target-sized or larger ferromagnetic object is selected from any one of: about the size of a knife, handgun, rifle (including an assault rifle), suicide bomb vest, motorbike, car, excavator, tractor and farm machinery. In an embodiment the target-sized object is selected from any one of about 0.2, 0.3, 0.4, 0.5, 0.6, 0.7, 0.8, 0.9 or 0.95 of the size of a knife, handgun, rifle, assault rifle, or suicide bomb vest. In an embodiment the target-sized object is selected from any one of about 0.2, 0.3, 0.4, 0.5, 0.6, 0.7, 0.8, 0.9 or 0.95 of the size of a motorbike, car, tractor or farm machinery. In an embodiment the system, is calibrated to generate a consequential alert when a fraction of the target-sized object is detected, e.g. selected from any one of about 0.2, 0.3, 0.4, 0.5, 0.6, 0.7, 0.8, 0.9 or 0.95 of a target-size object. In this context, the size refers to an equivalent associated magnetic moment, wherein all other conditions are the same. In an embodiment the target-sized or larger metal-containing object, wherein the target sized object has a magnetic moment equivalent to at least an unloaded, magazine-free, Colt AR6720 AR-15 tactical carbine weapon as manufactured 1 Jan. 2019, and wherein the weapon is traveling at a speed of 1 m/s, and wherein the plane formed by the longitudinal direction of the gun barrel and the handle is orientated normal to the ground and normal to a plane between two metal sensors of the system. In an embodiment the system is configured to detect a target-sized or larger metal-containing object, wherein the target sized object has a magnetic moment equivalent to at least an unloaded handgun, such as a GLOCK 19 Gen4 pistol in 9 mm Luger as manufactured 1 Jan. 2019, and wherein the gun is traveling at a speed of 1 m/s, and in which the longitudinal direction of the gun barrel is orientated parallel to the ground and wherein the handle is orientated in a plane normal to the ground and normal to a plane between two sensors of the system. In an embodiment, the human with a conventional/typical ferromagnetic load corresponds to a magnetic moment of less than about any one of 5, 10 20, 30, 40, 50, 60, 70, 80, 90 100, 125, 150, 175, 200, 250 and 300 mA·m2. In an embodiment, the human with a conventional/typical ferromagnetic load corresponds to a magnetic moment in excess of about any one of 1, 5, 10, 50, 100, 150, 200 and 250 mA·m2. In an embodiment the target-sized ferromagnetic object corresponds to a human with a conventional/typical ferromagnetic load, such as a person carrying a cellphone and/or set of keys. In an embodiment the system is configured to detect a target-sized or larger metal-containing object, wherein the target sized object has a magnetic moment equivalent to at least a battery-free iPhone 8 with a 4.7-inch display, as manufactured 1 Jan. 2019, and wherein the phone is traveling at a speed of 1 m/s, and in which the screen is orientated in a plane normal to the ground and normal to a plane between two sensors of the system. In an embodiment the magnetic moment of the target-sized ferromagnetic object is in excess of about 50, 100, 150, 200, 500, 750, 1000, 2000, 500, 750, 1000, 2000, 5,000 or 10,000 mA·m2. In an embodiment the magnetic moment of the target-sized ferromagnetic object is less than about 100, 150, 200, 500, 750, 1000, 2000, 500, 750, 1000, 2000, 5,000, 10,000 or 20,000 mA·m2. In an embodiment the security system is configured to detect the unauthorized/unexpected movement of a motorized vehicle like a motorbike, car, excavator, tractor or farm machinery.

In an embodiment the passive ferromagnetic detection means comprises one or more passive ferromagnetic sensors, arranged to measure the ambient magnetic field or gradient within a localized volume of space. In an embodiment the localized volume of space defines the ferromagnetic detection zone. In an embodiment the passive ferromagnetic sensors are selected from any one of amorphous magneto-resistive magnetometer, fluxgate sensor, magneto-resistive sensor, magneto-impedance sensor, Hall Effect sensor, and galvanic coil sensor. In an embodiment the passive ferromagnetic detection means comprises a sensor having a resolution of the order, or greater, than, 1 nano-Tesla (10^-9 T). In an embodiment the passive ferromagnetic detection means is a commercial off-the-shelf device, which may be part of a module or modular device. In an embodiment the passive ferromagnetic detection means comprises more than one ferromagnetic sensor. In an embodiment the passive ferromagnetic detection means comprises more than one ferromagnetic sensor defining one or more gradiometers. In an embodiment the baseline between sensors in the gradiometers is no more than 0.1, 1, 3, 5, 10, 15, 20, 25, 30, 40, 50, 75, 100, 200, 300, or 500 cm. In an embodiment the passive ferromagnetic detection means comprises orthogonally arranged sensors. In an embodiment, when the sensors are vector sensors, the vectors are suitably aligned for cooperative performance. In an embodiment the ferromagnetic detection zone is big enough to fit in a whole person. In an embodiment the ferromagnetic detection zone is big enough to fit in a vehicle or piece of farm machinery. Using more than one ferromagnetic sensor permits improve performance of the passive ferromagnetic detection means. This can reduce noise from external sources. In an embodiment mathematical operations of signals/outputs can enable more uniform sensing options (being less affected by the rapid decay in the magnetic signal with distance from the sensor). In an embodiment sensors may be arranged in space for better mutual performance e.g. may be aligned. In an embodiment more sensors can be used to police a larger detection zone. In an embodiment the sensors may be arranged to operate in a cooperative fashion, or each may be arranged to operate in a stand-alone monitoring station, or combinations thereof.

It is considered that there are many devices that may operate as a visitor/intruder register means. In an embodiment the visitor/intruder register means is any means or device capable of detecting or registering the presence of a person or object. In an embodiment the visitor/intruder register means is an IoT device or comprises an IoT device. In an embodiment the visitor/intruder register means comprises one or more of a doorbell, smart doorbell, camera, CCTV, infrared detector, IFD, PIR, movement sensor, window lock, window switch, door lock, door switch, shock sensor, vibration sensor, trip wire or beam, and pressure sensor. In an embodiment the doorbell, smart doorbell, camera, CCTV, IFD, PIR, movement sensor, window lock, window switch, door lock, door switch, shock sensor, vibration sensor and pressure sensor comprises the register assessment means. In an embodiment the smart doorbell comprises a camera. In an embodiment the smart doorbell comprises a webcam. In an embodiment the smart doorbell comprises CCTV. In an embodiment the smart doorbell comprises an imaging device. In an embodiment the smart doorbell comprises a microphone. In an embodiment the smart doorbell comprises a speaker. In an embodiment the smart doorbell comprises two or more of a camera, webcam, CCTV, imaging device, microphone and speaker. In an embodiment the smart doorbell comprises a wireless connection and/or wired connection to the internet. In an embodiment the smart doorbell is an IoT device. In an embodiment the smart doorbell is off the shelf and commercially available. In an embodiment the visitor/intruder register means is any one of a doorbell, smart doorbell, camera, CCTV, IFD, PIR, movement sensor, window lock, window switch, door lock, door switch, shock sensor, vibration sensor and pressure sensor.

In an embodiment, when the visitor/intruder register means is one or more of a doorbell, smart door bell, the visitor/intruder register means is arranged to register the presence of the visitor/intruder in the object detection zone (and to produce a register signal), when the doorbell or smart doorbell is activated, this is usually done by pressing the doorbell button. In an embodiment the visitor/intruder register means registers the visitor/intruder (i.e. in the object detection zone) when the doorbell button is pressed/activated. In an embodiment one or more further devices associated with the doorbell may be used to confirm the presence of the visitor/intruder (e.g. camera, webcam, CCTV, microphone, speaker etc.). In an embodiment, when the visitor/intruder register means is one or more of a camera, CCTV, IFD, PIR and/or movement sensor, the visitor/intruder register means is arranged to register the presence of the visitor/intruder in the object detection zone (and to produce a register signal), when the camera, CCTV, IFD, PIR and/or movement sensor, is activated; usually by registering a movement in the device's sensitivity range. In an embodiment, when the visitor/intruder register means is one or more of a window lock, window switch, door lock, door switch, shock sensor, vibration sensor or pressure sensor; the visitor/intruder register means is arranged to register the presence of the visitor/intruder in the object detection zone (and to produce a register signal), when the window lock, window switch, door lock, door switch, shock sensor, vibration sensor or pressure sensor is disturbed/ broken; usually by making or breaking an electrical or magnetic contact. In an embodiment the visitor/intruder register means registers the visitor/intruder (i.e. in the object detection zone) when the window lock, window switch, door lock, door switch, shock sensor, vibration sensor or pressure sensor is disturbed.

In an embodiment the ferromagnetic assessment means and/or register assessment means is hardware (e.g. a circuit board, chip, processor, electronic component/device and/or computer etc.). In an embodiment the ferromagnetic assessment means and/or register assessment means is software, such as an app or program, including an app or program adapted to run on a device like a cellphone). In an embodiment the ferromagnetic assessment means and/or register assessment means is software on a device like a cellphone. In an embodiment a circuit board, chip, processor and or computer comprises the ferromagnetic assessment means and/or register assessment means. In an embodiment the ferromagnetic assessment means and the register assessment means are the same, and/or are located on the same circuit board, chip, processor and or computer. In an embodiment the ferromagnetic assessment means and/or register assessment means is software, such as an app or program running on a cellphone. In an embodiment the ferromagnetic assessment means and the register assessment means are part of the same software package, e.g. an app or program running on a cellphone, tablet, computer etc.

In an embodiment the ferromagnetic assessment means, register assessment means, and/or end-user alert means are wirelessly connected to the security system. In an embodiment, the ferromagnetic assessment means and/or register assessment means are remote, possibly located on a remote server or hosted via a cloud-based service. While there are benefits to having a security system where all the parts are located locally, there are also benefits to having such operations performed remotely, possibly on a remote server. Such a remote server may be arranged to serve one system of the invention, or could be configured to serve multiple security systems of the invention. Such as system permits a saving on costs by serving multiple units of the invention, reducing deployment costs, and permits for example software and updates to be enacted simply over a wide user-base. A subscription to the server, and hence services, is facilitated by such a remote server. A remote server and services permits modular, off the shelf, units to be connected together simply. This also permits AI/machine learning approaches. In an embodiment the personal device is wirelessly connected to the security system. In an embodiment the wireless connection is by internet router, Bluetooth, internet, cloud and/or cloud-based server. In an embodiment the wireless connection comprises Local/Personal/Home/Neighborhood/Field Area Networks (i.e. LAN, PAN, HAN, NAN and FAN). Wired connections are also considered. A further advantage is that multiple properties/locations can be monitored on the same end-user alert means.

In an embodiment the end-user alert means is configured in use to warn an end-user within the location to be secured, and/or another person or entity remotely located. The benefit of being remotely connected is that it allows end-users who are external to the location being policed to also monitor the location. This end-user could be a security guard or simply a homeowner on holiday or at work. For example, a homeowner could monitor visitors approaching their property, the delivery of an expected item, and/or note and record the theft of a package left on a doorstep. In an embodiment the alert is audible, visual, vibrational and/or haptic. The nature of the alert is not limited. The aim is to draw attention to the potential security problem. In that way, informed action may be taken. Flashing lights and sounds are a useful way to get the end-user's attention, but a vibrational alert might be used to alert the end-user without drawing unwanted attention to the end-user. In an embodiment a text message or email is delivered to the end-user, also possibly capturing a video clip of the event that triggered the alert. In an embodiment the end-user is one person or a group of people. In an embodiment the end-user is an AI, program or machine responsible for taking action based on a security protocol or learned protocol. In an embodiment the information is shared so that an AI (or more than one AI) are arranged to benefit from the information gathered by units of the invention.

In an embodiment the end-user alert means provides an indication of the potential threat level (e.g. none, low, moderate, high etc.). In an embodiment the threat level is indicated by a traffic-light-like warning color system (e.g. green for safe, through to red indicating a potentially high threat level). In an embodiment the end-user alert means provides safety guidance and/or recommendations to the end-user. In an embodiment the end-user alert means warns an enforcement body, such as the police.

In an embodiment the end-user alert means triggers a central alarm system, e.g. within the location to be secured. In an embodiment the end-user alert means triggers a precautionary warning/alert when the ferromagnetic detection means indicates the presence of a threat-sized object, but the visitor/intruder register means has not yet registered an object.

In an embodiment the end-user alert means activates or accesses a further security device such as a camera, CCTV, imaging device, floodlight, microphone and/or speaker. In an embodiment the further security device is an IoT device. In an embodiment a live stream is provided to the end-user from the IoT device. In an embodiment the live stream is recorded. In an embodiment the live stream prior to the triggering event is recorded (e.g. any one of 5, 10, 30, 60, 120, 300 and 600 seconds prior to the triggering of the alert means). Recording the livestream may occur in the event that the ferromagnetic detection means detects an object above an alert threshold. The alert threshold being tailored to suit the level required. When near a window, the threshold may be relatively low (to capture human activity, such as a person carrying a cellphone and/or set of keys, e.g. set to exclude domestic pets etc.). When near an entrance to a building, the alert threshold may be relatively high (e.g. to capture a threat sized object like a handgun, rifle, assault weapon or suicide bomb vest). When policing an ATM or farmer's garage, the alert threshold may be much higher so as to capture moving heavy machinery.

In an embodiment the IoT device is configured to allow the end-user to communicate with the visitor/intruder, e.g. via the end-user alert means. In an embodiment the further security device or IoT device is arranged to confirm the presence or identity of the visitor/intruder. In an embodiment the further security device or IoT device is configured with biometric recognition capabilities such as, face, fingerprint or speech recognition. In an embodiment the system, further security device or IoT device is configured with vehicle and vehicle plate recognition.

In an embodiment when the security system comprises more than one passive ferromagnetic detection means, these may be arranged to define an extended ferromagnetic detection zone. In an embodiment when the security system comprises more than one visitor/intruder register means, these may be arranged to define an extended object detection zone. In an embodiment the extended ferromagnetic detection zone and extended object detection zone may define an extended protection/policing zone around a location to be secured.

In an embodiment the security system is an extended security system comprising two or more linked units of the invention. In an embodiment the security system comprises one or more further parts (i) to (v). It can be useful to have more than one visitor/intruder register means and/or passive ferromagnetic detection means. It can also be useful to have more than one end-user alert means. It can be useful to have more than one register assessment means and/or ferromagnetic assessment means. Depending on the need of the end-user or end-users, the security system may have multiple units or components of the invention. If the location to be secured has multiple entry points, then multiple embodiments of the invention could be used to police these entry points. Alternatively, a single (extended) embodiment of the invention could be used to police all the entry points. In an embodiment the security system is an integrated unit. A single unit has the benefit that all the parts necessary to deploy the invention are provided in a single convenient unit. This offers the benefit of simplifying home and DIY-type installation. In an embodiment the security system is comprised of one or more of the parts (i) to (v) as separate units, the units connected together by wires or wirelessly. In an embodiment the security system is arranged to police a single entry point of the location to be secured, and may employ additional parts (i) to (v), or compound units thereof. In an embodiment the compound unit comprises two or more parts (i) to (v). In an embodiment the compound unit comprises two or more parts of (i) and (ii). In an embodiment the compound unit comprises two or more parts of any one of (iv) and (v). In an embodiment the security system is arranged to police multiple entry points of the location to be secured and may require additional parts (i) to (v), or compound units thereof. In an embodiment part (iii) (or additional part (iii)) may be supplied to the end user as a device. In an embodiment, if the user owns a device (like a cellphone), the device may be given permission to access the system. In an embodiment part (iii) may be a software application/program, such as a cellphone app, and the software may be provided directly (e.g. on a memory stick) or may be available for download from a remote source e.g. app store or website. In an embodiment the security system comprises modular parts (i) to (v), or modular parts comprising units of parts (i) to (iv), the modular parts configured to be readily integrated into or out of the security system. Modular parts and kits of parts allow the embodiments of the invention to be expanded easily, and allow for a reduction in overall manufacture costs. Downloadable software is cheaper to provide that hardware-type solutions. Software solutions can provide useful data and metrics for improving the operation of the system and allow for improved detection solutions. In an embodiment the invention is a kit of parts. In an embodiment the invention is a kit of modular parts. In an embodiment a module comprises parts (i) to (ii). In an embodiment a module comprises parts (iv) and (v). In an embodiment the module is an IoT device. In an embodiment the module is portable, e.g. having a volume no larger than 0.01, 0.05, 0.1, 0.2, 0.3, 0.4, 0.5, 0.7, 0.8, 0.9, 1, 2, 3, 4 or 5 liters in size. In an embodiment the module is configured to fit in, around, above or below a doorway or window. In an embodiment the passive ferromagnetic detection means is weather tight. In an embodiment the visitor/intruder register means is weather tight. In an embodiment the module is weather tight.

In an embodiment the passive ferromagnetic detection means is RF tight. In an embodiment the passive ferromagnetic detection means or ferromagnetic assessment means comprises one or more filters, e.g. high and/or low pass filters. These filters being configured in use to reduce interference from background magnetic field sources. In certain situations, it is useful to reduce background 'noise' using filters, providing improved overall performance of the sensors. In an embodiment the security system, or parts thereof, are mains powered, battery powered and/or powered by a renewable power source. In an embodiment the renewable power source is solar or wind power. In an embodiment the power source is Power over Ethernet (PoE) or USB powered, which conveniently provides power and communication lines. Mains power is convenient and reliable. Battery power however offers the chance to move the powered parts to various locations. This can keep would-be intruders uncertain of the deployment strategy. Also, if a component of the invention (e.g. a wirelessly linked ferromagnetic sensor) is hidden in an outdoor object, such as in a garden ornament, this permits deployment without the need for obvious telltale wires or buried cables. In a related fashion, a renewable power source (like solar power) might be a convenient way to power an outdoor device. In an embodiment the security system is configured to be temporarily deactivated. In an embodiment the security system may be deactivated by an approved user or approved user device. In an embodiment the security system may be deactivated when the personal device of the end-user is detected in the ferromagnetic detection zone and/or object detection zone and/or when a deactivation button is pressed or passcode entered. In an embodiment the security system is temporarily deactivated by a passcode using a passcode reader, or RFID tag. At times it might be useful to temporarily deactivate the system. This might be a one-off event, for example to permit an approved person to enter a location; or it could be a scheduled/timed event, e.g. deactivated during the working day.

In an embodiment the end-user alert means is configured to raise an alert/warning when the ferromagnetic assessment output indicates the presence of a target-sized or larger ferromagnetic object and concurrently the visitor/intruder assessment output indicates the presence of a visitor/intruder. In an embodiment the end-user alert means is configured to raise an alert when the ferromagnetic assessment output indicates the presence of a target-sized or larger ferromagnetic object moving within the ferromagnetic detection zone, and concurrently the visitor/intruder assessment output indicates the presence of a visitor/intruder.

In an embodiment the security system comprises a memory, or is configured to have access to a memory. In an embodiment the memory is configured in use to store historical data from the passive ferromagnetic detection means and/or visitor/intruder register means. In an embodiment the security system comprises a memory, or is configured to have access to a memory, the memory configured to store historical measurement signals, register signals, ferromagnetic assessment outputs and/or visitor/intruder assessment output data. In an embodiment the end-user alert means is configured in use to raise an alert/warning when the measurement signal or ferromagnetic assessment output historical data indicates the presence of a target-sized or larger ferromagnetic object in the ferromagnetic detection zone, and when this is in close temporal proximity to the register signal or visitor/intruder assessment output indicating the presence of a visitor/intruder in the object detection zone. In an embodiment the end-user alert means is configured to raise an alert when the register signal or visitor/intruder assessment output historical data indicates the presence of a visitor/intruder in the object detection zone and when this is in close temporal proximity to the measurement signal or ferromagnetic assessment output indicating the presence of a target-sized or larger ferromagnetic object in the ferromagnetic detection zone. In an embodiment the close temporal proximity is selected from up to 0.1, 0.25, 0.5, 1, 2, 3, 4, 5, 6, 7, 8, 9, 10, 15, 20, 30, 60, 90, 120 and 180 seconds. In an embodiment the close temporal proximity is selected from less than 0.25, 0.5, 1, 2, 3, 4, 5, 6, 7, 8, 9, 10, 15, 20, 30, 60, 90, 120 and 180 seconds. In an embodiment the security system comprises a self-learning program; artificial intelligence (AI). In an embodiment the system may be configured to be operable during certain times of the day, such as after work hours, during work hours, or all hours. A memory allows historical information to be stored for future use. In an embodiment, the memory stores/preserves evidence of a crime, or is used to improve overall performance of the invention. In an embodiment, the memory contains an operating system. In an embodiment, the memory provides a protocol of actions when certain events are triggered. In an embodiment, the memory provides pre-programed modes of using the invention (e.g. human being detection mode, threat weapon detection mode or vehicle detection mode), tailored to certain types of use. In an embodiment, the memory provides pre-programed modes of action when certain events are triggered. In an embodiment, the system has means to reprogram the system, or select certain modes, this may be done directly or remotely. In an embodiment, the system is provided with an access interface to allow end-user control.

In a fourth aspect of the invention, there is provided the use of a security system comprising a visitor/intruder register means and a passive ferromagnetic detection means to screen an outdoor visitor/intruder for potentially dangerous ferromagnetic objects.

There is also provided, the use of a security system comprising a visitor/intruder register means, a passive ferromagnetic detection means and an end-user alert means, wherein in use the end-user alert means is configured to raise an alert when the visitor/intruder register means registers a visitor/intruder and the ferromagnetic detection means indicates the presence of a target-sized or larger ferromagnetic object.

There is also provided the use of a security system as defined hereinabove configured to screen a visitor/intruder for potentially harmful ferromagnetic objects. Visitors often present themselves at locations like domestic dwellings, often unannounced. The present invention usefully allows the visitor to be screened for concealed threats.

In a fifth aspect of the invention, there is provided the use of a security system as defined in any one of the preceding aspects or disclosures above, configured to reduce false positives associated with a visitor/intruder register means registering a visitor/intruder when the visitor/intruder is not carrying a target-sized or larger ferromagnetic object, such as a dangerous ferromagnetic object (e.g. handgun, rifle, suicide bomb vest). As such, in this aspect the system may be usefully used to screen for human-based activity at a location, usefully discriminating this activity from nonhuman-based (e.g. animal) activity at the same location. This is because humans tend to have metal items on them (e.g. cellphone and/or keys etc.) whereas animals and weather phenomena do not. As such, a remote location like a window may be policed for human-based activity by the invention, and while also negating false alerts generated from non-threat sources like moving pets. Also, visitors often present themselves at locations like domestic dwellings, often unannounced. The present invention also usefully allows the visitor to be screened for concealed threats.

There is also provided the use of a security system as defined in any one of the above aspects of the invention.

There is also provided a method of protecting an entry point of a location to be secured, comprising the steps of:
  (a) measuring an ambient magnetic field or its gradient in a ferromagnetic detection zone using a passive ferromagnetic detection means comprising at least one magnetic sensor, and producing a corresponding measurement signal, wherein the ferromagnetic detection zone is arranged to cover the entry point of a location to be secured, or is arranged to be proximate, or adjacent to, the entry point of the location to be secured;
  (b) registering a visitor/intruder using a visitor/intruder register means adapted to register the presence of a visitor/intruder within an object detection zone, and producing a corresponding register signal, wherein the object detection zone is arranged to cover the entry point of the location to be secured, or is arranged to be proximate, or adjacent to, or on, the entry point of the location to be secured;
  (c) identifying temporal variations in the measurement signal produced by the passive ferromagnetic detection means due to the movement of a ferromagnetic object within the ferromagnetic detection zone and providing a ferromagnetic assessment output to an end-user alert means
  (d) assessing the register signal for the presence of a visitor/intruder in the object detection zone and providing a visitor/intruder assessment output to the end-user means
  (e) assessing the ferromagnetic assessment output and the visitor/intruder assessment output using the end-user alert means, and raising a alert when the ferromagnetic assessment output indicates the presence of a target-sized or larger ferromagnetic object within the ferromagnetic detection zone, and concurrently the object assessment output indicates the presence of a visitor/intruder in the object detection zone.

In a sixth aspect of the invention, there is provided a method of protecting a window or a non-conventional entry point of a location to be secured, comprising the steps of:
  (a) measuring an ambient magnetic field or its gradient in a ferromagnetic detection zone using a passive ferromagnetic detection means comprising at least one magnetic sensor, and producing a corresponding measurement signal, wherein the ferromagnetic detection zone is arranged to cover the window or non-conventional entry point of a location to be secured, or is arranged to be proximate, or adjacent to, the window or non-conventional entry point of the location to be secured;
  (b) identifying temporal variations in the measurement signal produced by the passive ferromagnetic detection means due to the movement of a ferromagnetic object within the ferromagnetic detection zone and providing a ferromagnetic assessment output to an end-user alert means
  (c) assessing the ferromagnetic assessment output using the end-user alert means, and raising a warning when the ferromagnetic assessment output indicates the presence of a target-sized or larger ferromagnetic object within the ferromagnetic detection zone, and wherein the target-sized object corresponds to a human with a conventional ferromagnetic load, such as a human carrying a cellphone and/or a set of keys.

In a seventh aspect of the invention, there is provided a method of protecting a window or a non-conventional entry point of a location to be secured, comprising the steps of:

(a) measuring an ambient magnetic field or its gradient in a ferromagnetic detection zone using a passive ferromagnetic detection means comprising at least one magnetic sensor, and producing a corresponding measurement signal, wherein the ferromagnetic detection zone is arranged to cover the window or a non-conventional entry point of a location to be secured, or is arranged to be proximate, or adjacent to, the window or a non-conventional entry point of the location to be secured;

(b) registering a visitor/intruder using a visitor/intruder register means adapted to register the presence of a visitor/intruder within an object detection zone, and producing a corresponding register signal, wherein the object detection zone is arranged to cover the window or a non-conventional entry point of the location to be secured, or is arranged to be proximate, or adjacent to, or on, the window or a non-conventional entry point of the location to be secured;

(c) identifying temporal variations in the measurement signal produced by the passive ferromagnetic detection means due to the movement of a ferromagnetic object within the ferromagnetic detection zone and providing a ferromagnetic assessment output to an end-user alert means (d) assessing the register signal for the presence of a visitor/intruder in the object detection zone and providing a visitor/intruder assessment output to the end-user means (e) assessing the ferromagnetic assessment output and the visitor/intruder assessment output using the end-user alert means, and raising an alert when the ferromagnetic assessment output indicates the presence of a target-sized or larger ferromagnetic object within the ferromagnetic detection zone, and concurrently the object assessment output indicates the presence of a visitor/intruder in the object detection zone, and wherein the target-sized object corresponds to a human with a typical ferromagnetic load, such as a human carrying a cellphone and/or a set of keys.

There is also provided a method of operating a security system as defined in any one of the first to fourth aspects.

In an embodiment the method comprises using any one of the systems/embodiments herein disclosed.

The present invention will now be further described with reference to the following non-limiting examples and the accompanying illustrative drawings, of which:

BRIEF DESCRIPTION OF THE DRAWINGS

Like features have been given like reference numerals. The schematic representations are illustrative, and so are not indicative of scale or relative proportion.

DETAILED DESCRIPTION OF THE EMBODIMENTS

Figure 1:
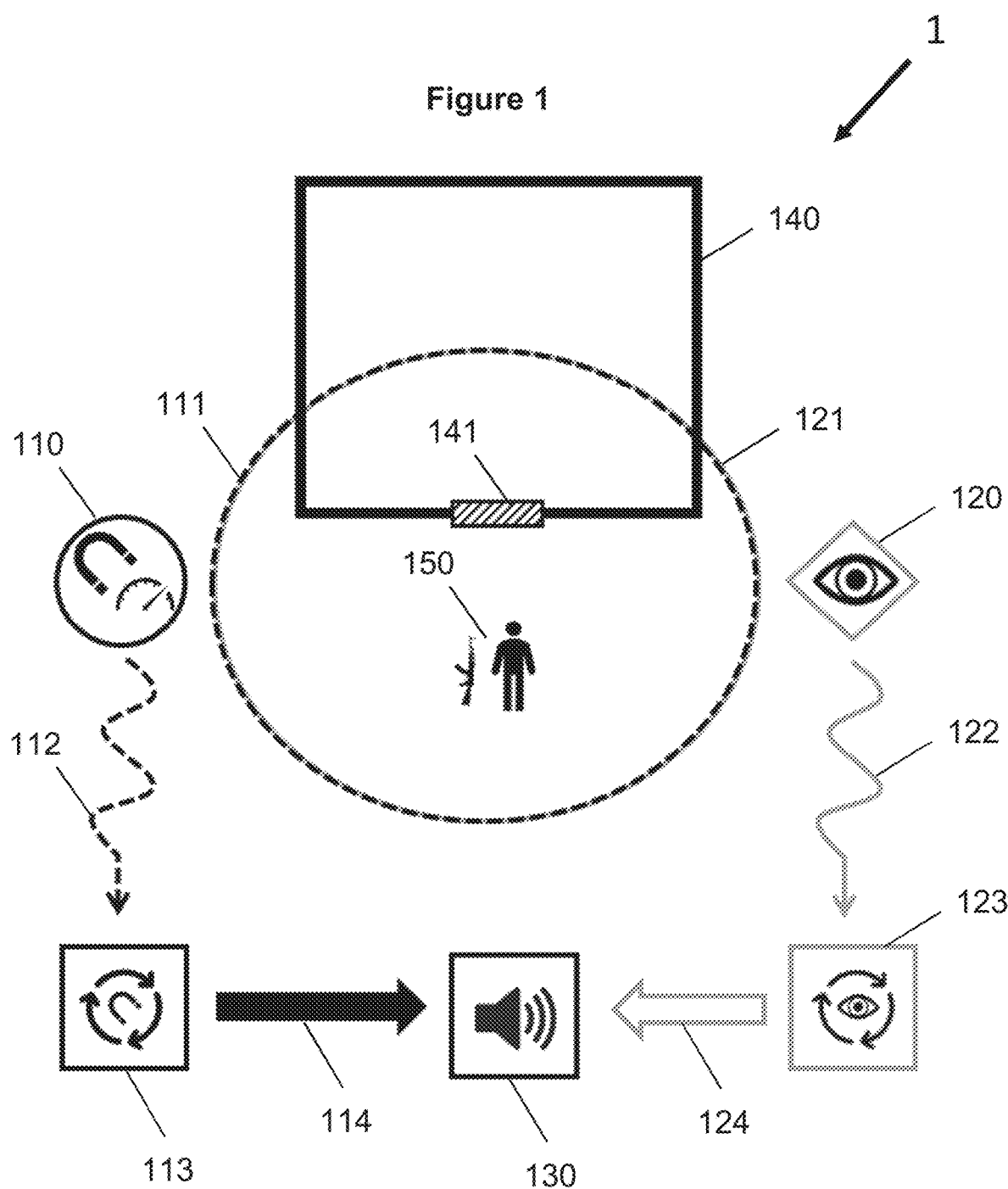
FIG. 1 shows a schematic representation of an embodiment of the invention.

FIG. 1 shows a schematic representation of an embodiment of the security system of the invention (1), which is arranged to police a doorway (141) in a domestic dwelling (140), the doorway being an entry point of a location to be protected. In the depicted embodiment, an intruder (150) with a concealed rifle is approaching the doorway (141) of the dwelling (140). A passive ferromagnetic detection means (110) equipped with ferromagnetic sensors defining a gradiometer (not shown), is arranged to measure an ambient magnetic field within a ferromagnetic detection zone (111), the zone encompassing the doorway (141). The ferromagnetic detection means (110), produces a measurement signal (112), in response to the change in ambient magnetic field caused by the movement of the armed intruder in the ferromagnetic detection zone (111). The measurement signal (112) is provided to the ferromagnetic assessment means (113), which is located on a circuit board (not shown). The ferromagnetic assessment means (113), identifies the temporal variations in the measurement signal (112) and provides a ferromagnetic assessment output (114) to the end-user alert means (130). Concurrently, a visitor/intruder register means (120) equipped with a camera (not shown) is arranged to register a visitor/intruder in an object detection zone (121), which also covers the same doorway (141). In this embodiment, the ferromagnetic detection zone (111) and object detection zone (121) overlap defining a concurrent detection zone. The visitor/intruder register means (120) produces a register signal (122), in response to the movement of the intruder registered in the object detection zone (121). The register signal (122) is provided to a register assessment means (123), which is located on a circuit board (not shown). The register assessment means (123) identifies the temporal variations in the register signal (122) and provides a visitor/intruder assessment output (124) to the end-user alert means (130). The end-user alert means (130) is a program/app hosted on a cellphone (not shown), and is connected to the ferromagnetic assessment means (113) and register assessment means (123) by a wireless connection over the internet (not shown). The end-user alert means (130) raises an alert (not shown) because the target-sized or larger ferromagnetic object (i.e. the rifle) is detected in the ferromagnetic detection zone (111), and because a visitor/intruder is also registered concurrently in the object detection zone (121). In the situation where the intruder was not carrying a target-sized or larger ferromagnetic object, then the end-user alert means (130) would not have raised an alert.

Figure 2:
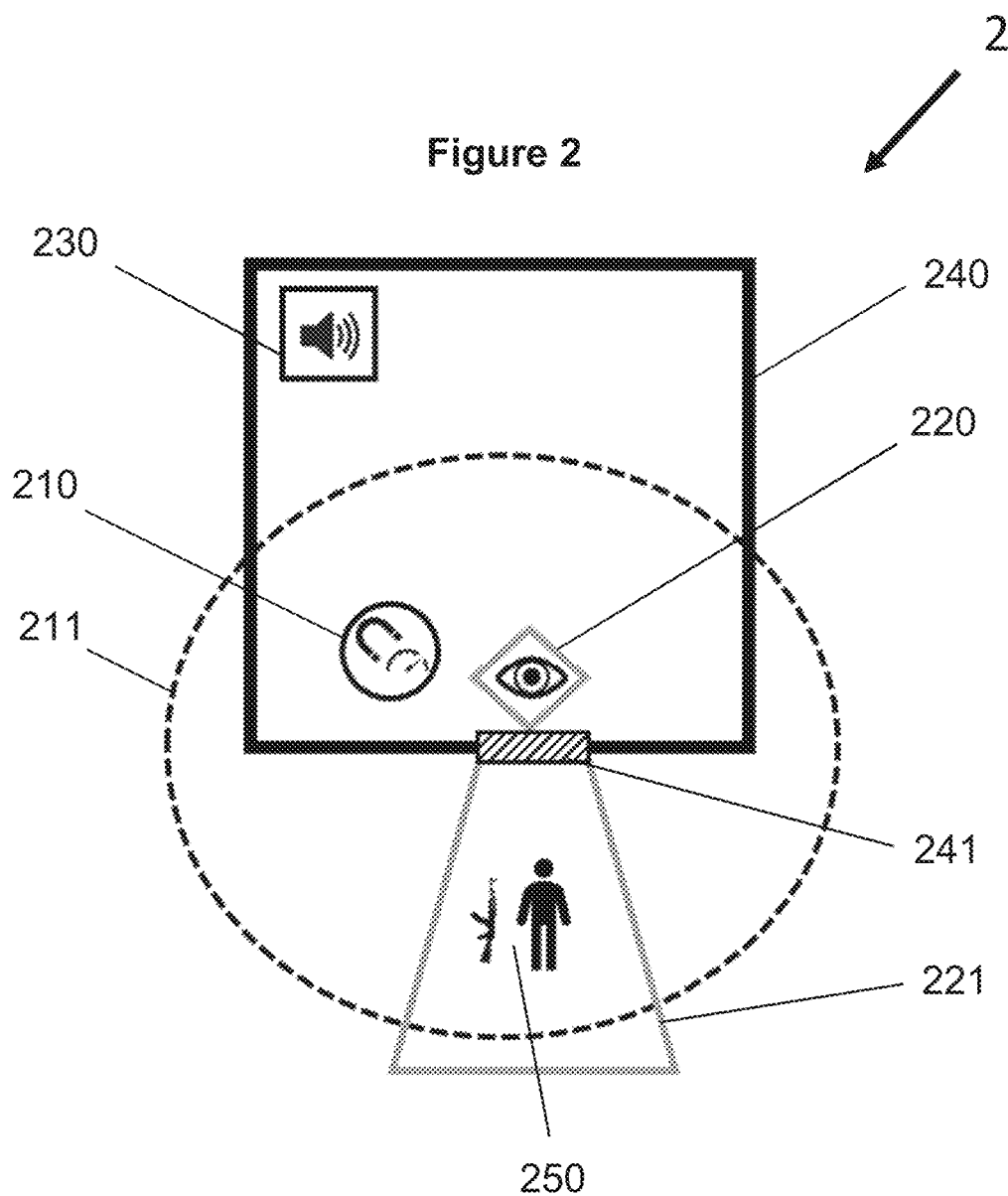
FIGS. 2 to 6 show further schematic representations of embodiments of the invention.

FIG. 2 is substantially the same arrangement as described in FIG. 1, except in this embodiment (2), the ferromagnetic detection means (210), visitor/intruder register means (220) and the end-user alert means (230) are shown as located within the dwelling (240). Also for simplicity, the corresponding measurement signal, ferromagnetic assessment means, ferromagnetic assessment output, register signal, register assessment means and visitor/intruder assessment output have not been shown in FIGS. 2 to 6. In this embodiment the visitor/intruder register means (220) is a camera located in the door of the doorway (241). The ferromagnetic detection means (210) is indoors but spaced away from the doorway. In the embodiment the ferromagnetic detection zone (211) and object detection zone (221) partially overlap, the area of overlap defining a concurrent detection zone, the zone in which the armed intruder (250) is depicted moving in.

Figure 3:
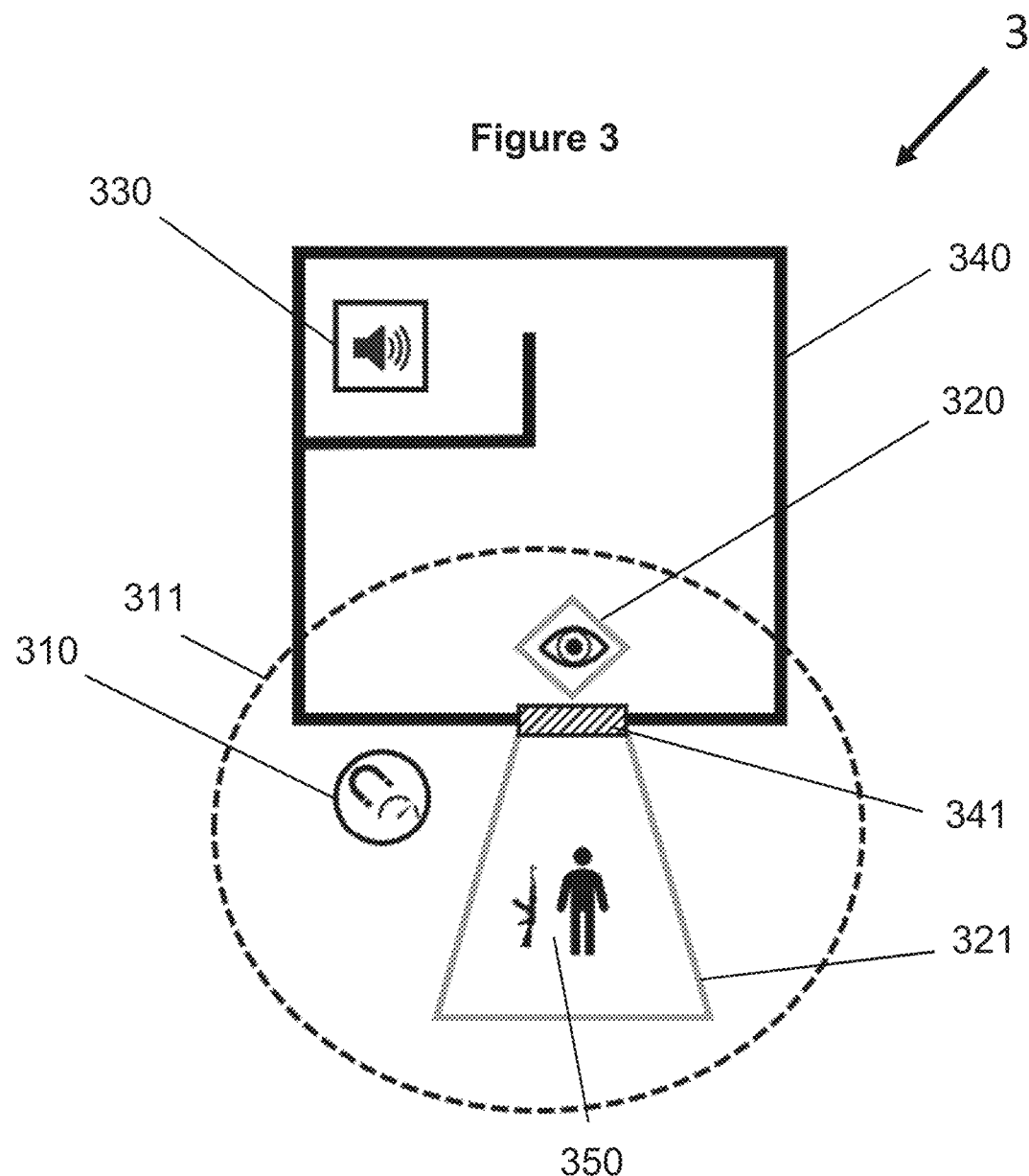

FIG. 3 is substantially the same arrangement as described in FIG. 1, except in this embodiment (3), the visitor/intruder register means (320) and end-user alert means (330) are shown as located within the building (340) and the ferromagnetic detection means (310) is shown outdoors. In this embodiment the visitor/intruder register means (320) is a camera located in a smart doorbell located at the door of the doorway. The ferromagnetic detection means (310) is concealed in a garden ornament (not shown) and is spaced away from the doorway (341). In this embodiment, the end-user alert means (330) is located in a security monitoring station within the location (340). In the embodiment the ferromagnetic detection zone (311) encompasses the object detection zone (321), the area of overlap defining a concurrent detection zone, the zone in which the armed intruder (350) is depicted moving in.

Figure 4:
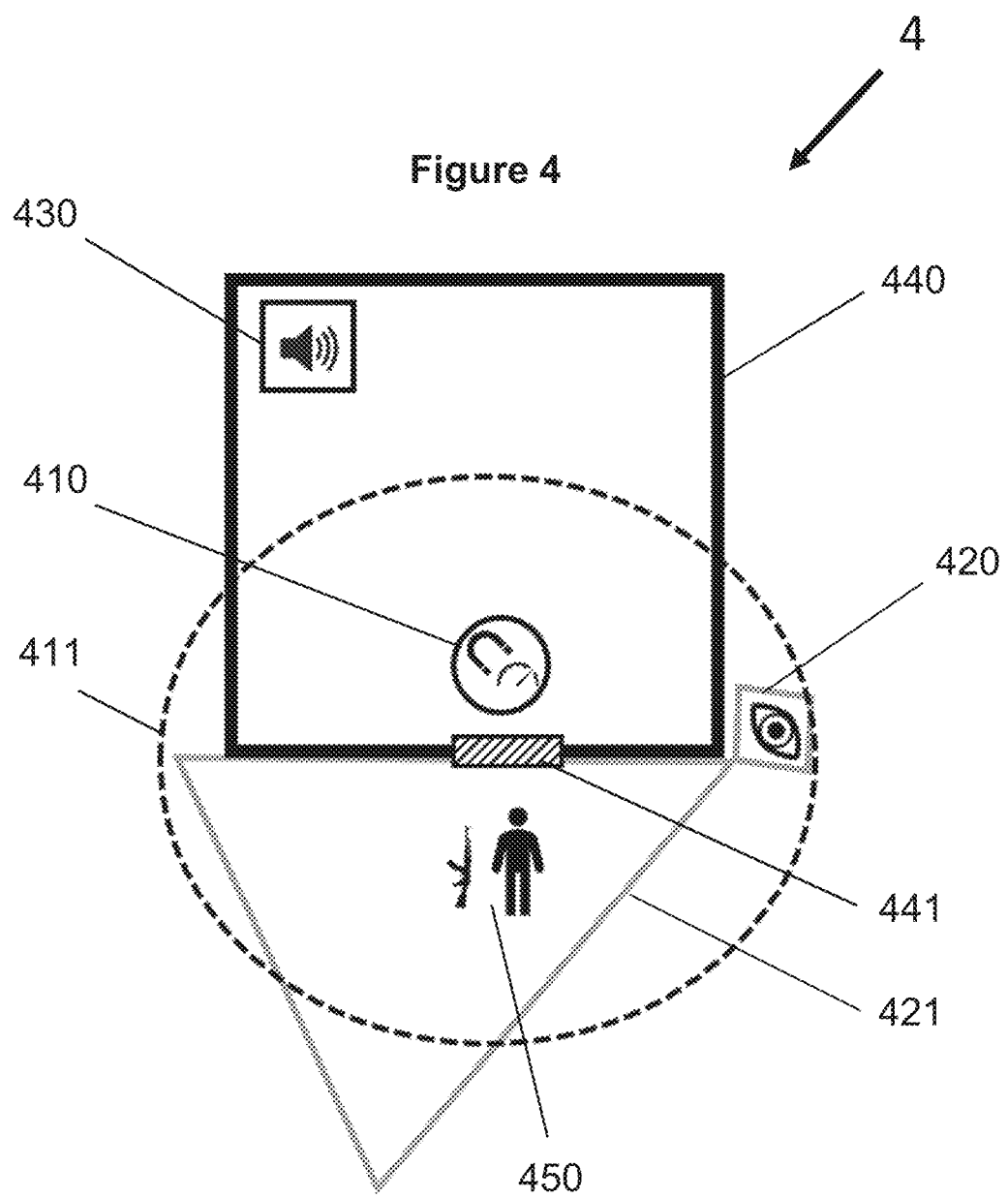

FIG. 4 is substantially the same arrangement as described in FIG. 1, except in this embodiment (4), the ferromagnetic detection means (410) and end-user alert means (430) are shown as located within the dwelling (440) and the visitor/intruder register means (420) is shown outdoors. In this embodiment the visitor/intruder register means (420) is a wall-mounted PIR sensor (not shown). The ferromagnetic detection means (410) is indoors and located above a window (441). In the embodiment the ferromagnetic detection zone (411) and object detection zone (421) partially overlap, the area of overlap defining a concurrent detection zone, the zone in which the armed intruder (450) is depicted moving in.

Figure 5:
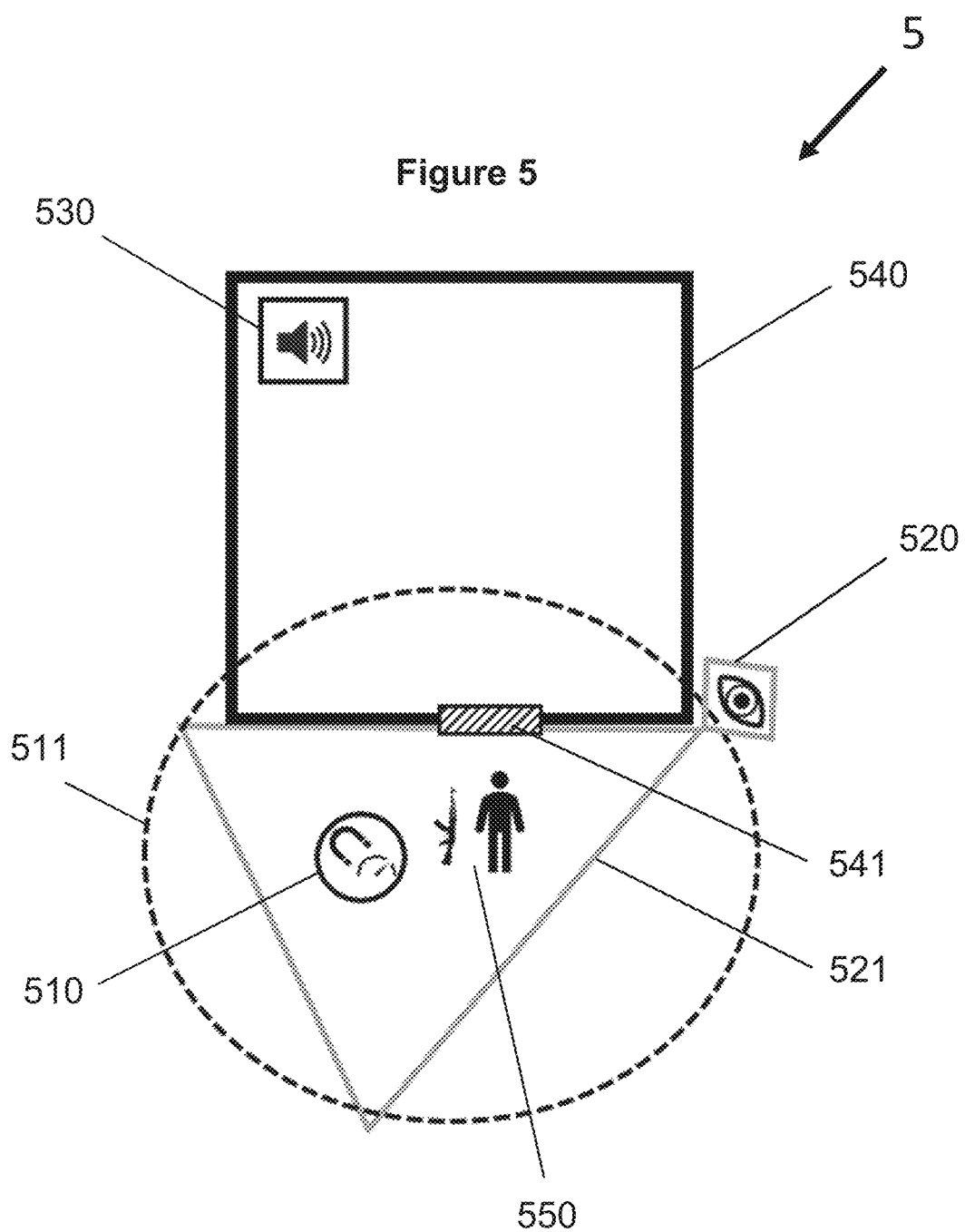

FIG. 5 is substantially the same arrangement as described in FIG. 1, except in this embodiment (5), the end-user alert means (530) is shown as located within the building (540) and the ferromagnetic detection means (510) and visitor/intruder register means (520) is shown outdoors. In this embodiment the visitor/intruder register means (520) is a wall-mounted CCTV camera (not shown). The ferromagnetic detection means (510) is located under an external walkway (not shown) leading to the doorway (541). In the embodiment the ferromagnetic detection zone (511) and object detection zone (521) partially overlap, the area of overlap defining a concurrent detection zone, the zone in which the armed intruder (550) is depicted moving in.

Figure 6:
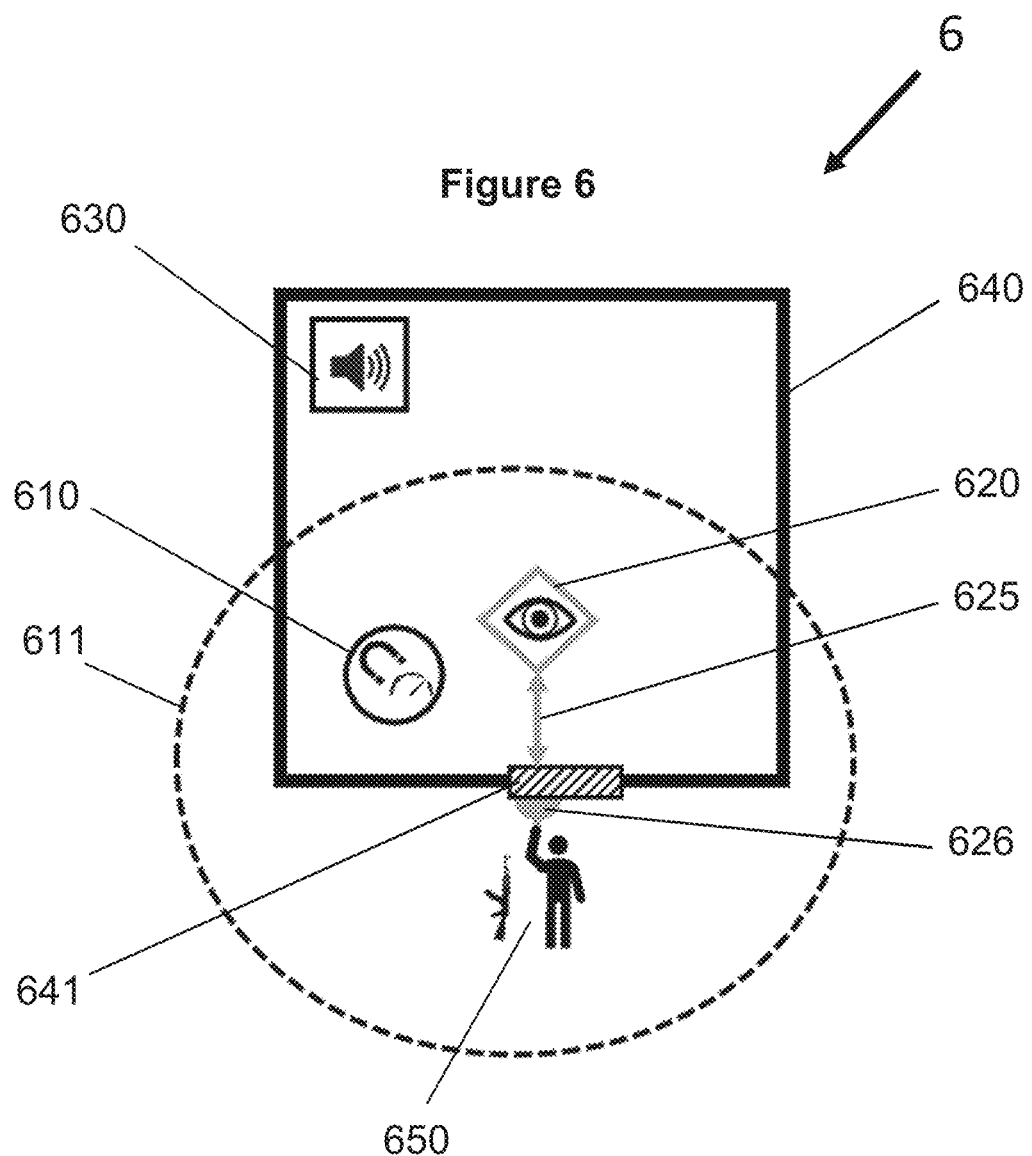

FIG. 6 is substantially the same arrangement as described in FIG. 1, except in this embodiment (6), the ferromagnetic detection means (610), visitor/intruder register means (620) and end-user alert means (630) are shown as located within the dwelling (640). In this embodiment the visitor/intruder register means (620) comprises a doorbell located in the door of the doorway (641). When the doorbell button (626) is pressed by the visitor/intruder, the visitor/intruder is registered by the visitor/intruder register means (620). In the embodiment the ferromagnetic detection zone (611) covers the object detection zone (621), the object detection zone in effect covering a person pressing the doorbell.

Figure 7:
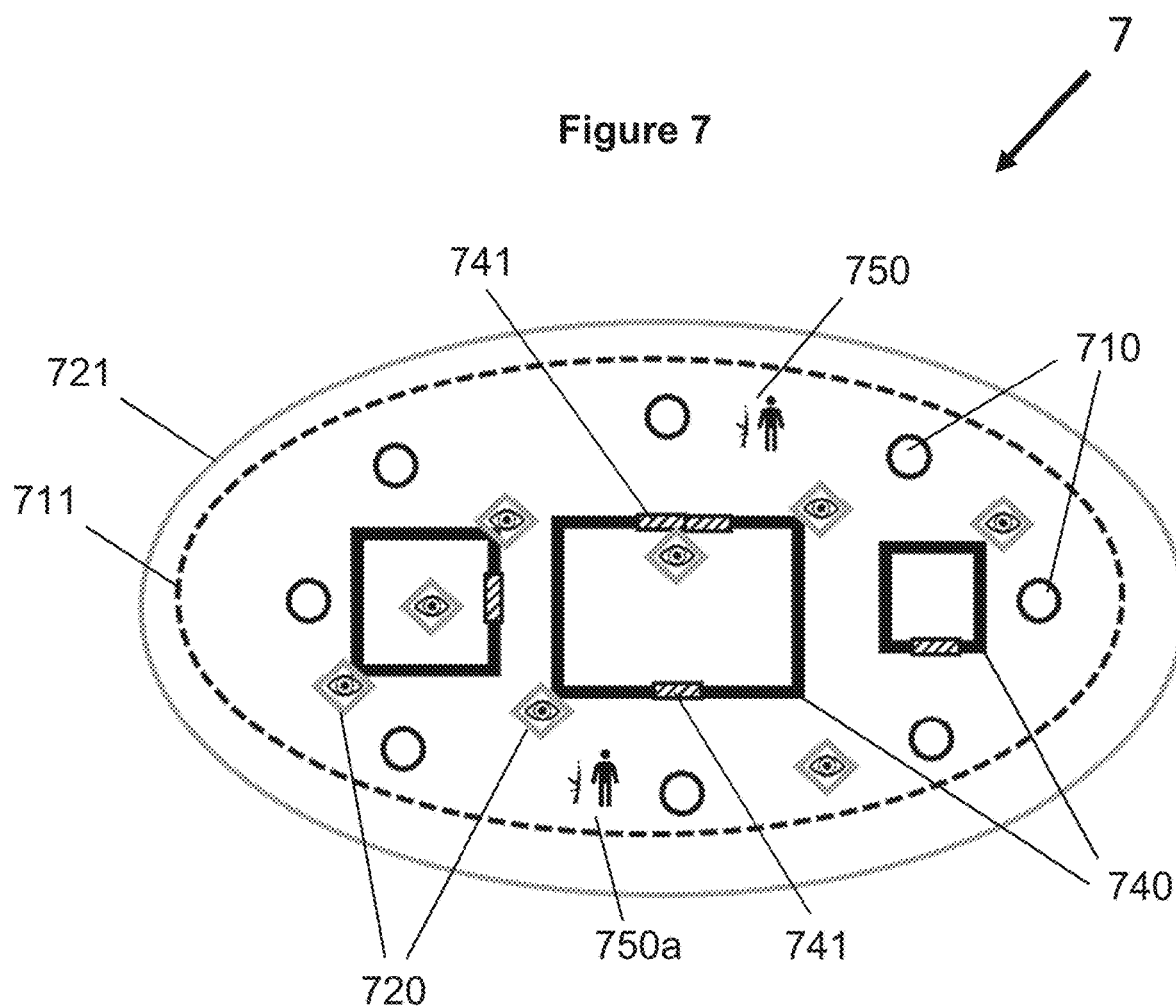
FIG. 7 shows a schematic representation of an embodiment of the invention protecting several buildings.

FIG. 7 is substantially the same arrangement as described in FIG. 1, except in this embodiment (7), the arrangement covers several industrial buildings (740) in an extended policing zone. For simplicity of depiction, the measurement signal, ferromagnetic assessment means, ferromagnetic assessment output, register signal, register assessment means, visitor/intruder assessment output and end-user alert means have not been shown in this figure. A group of ferromagnetic detection means (710) define and extended ferromagnetic detection zone (711) around the buildings (740) being protected, each building having at least one entry point (741). A group of visitor/intruder register means (720) define an extended object detection zone (721). In this embodiment, the visitor/intruder register means inside the biggest building is a smart doorbell and the one inside the smaller building is a PIR sensor; the externally wall-mounted visitor/intruder register means are CCTV cameras; and the remaining visitor/intruder register means is concealed within an information display sign. The ferromagnetic detection means (710) and visitor/intruder register means (720) are wired to a centrally monitored end-user alert means (not shown). In the embodiment the extended ferromagnetic detection zone (711) lies within the extended object detection zone (721), the area of overlap defining a concurrent detection zone, the zone in which the armed intruders (750 and 750a) are depicted moving in. In the embodiment, the system will pick the two intruders as separate instances, drawing the CCTV operator to the appropriate CCTV camera feeds.

Figure 8:
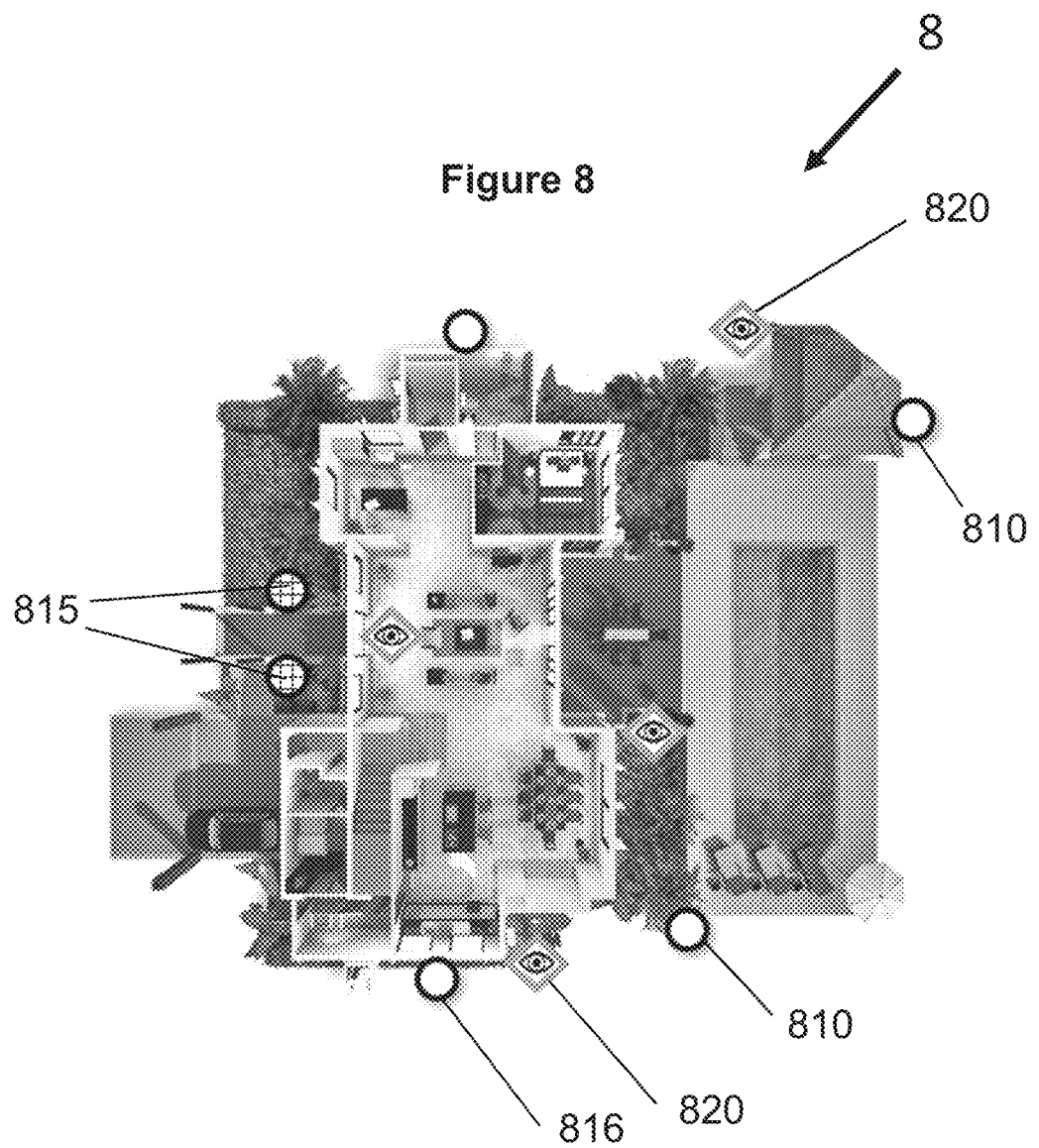
FIG. 8 shows a schematic representation of an embodiment of the invention protecting a domestic dwelling.

FIG. 8 is a similar arrangement to that described in FIG. 7, except in this embodiment (8) a single domestic dwelling is being protected and covered by an extended ferromagnetic detection zone (not shown) and an extended object detection zone (not shown). In this embodiment, the threat-object ferromagnetic detection stations (815), concealed in bollards, are tuned to trigger and send a threat output when a threat-sized object is detected approaching the main entrance to the dwelling. In this embodiment, human-activity ferromagnetic detection station (816), located inside above a window, is tuned to trigger and send a threat output when ferromagnetic objects associated with human activity are sensed near the associated window of the dwelling. In this case the threat-object ferromagnetic detection stations (815) have higher alert thresholds (de-tuned) as compared to the human-activity ferromagnetic detection station (816). In this embodiment, the internal visitor/intruder register means is a smart doorbell, the wall-mounted visitor/intruder register means are PIR sensors.

Figure 9:
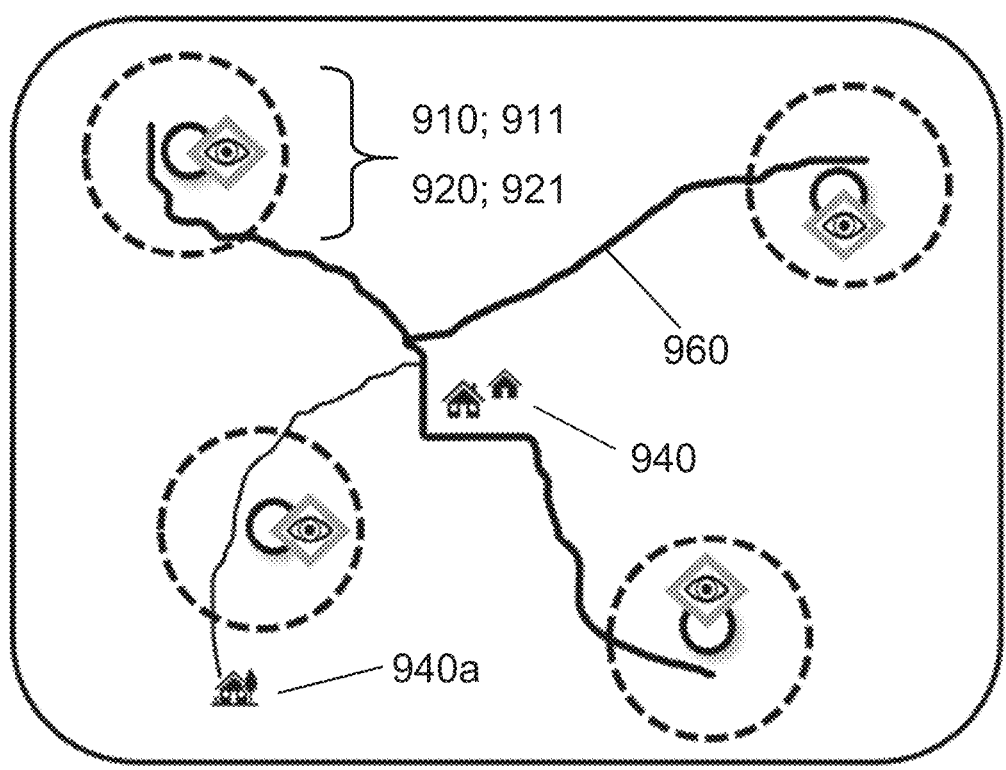
FIG. 9 shows a schematic representation of an embodiment of the invention policing various entry points giving access to a remote location.

FIG. 9 shows a schematic representation of an embodiment of the security system of the invention (9), which is arranged to police points along access roads (960) leading to/from a main farm building (940) and outbuildings (940a). For simplicity of depiction, at least the measurement signal, ferromagnetic assessment means, ferromagnetic assessment output, register signal, register assessment means, visitor/intruder assessment output and end-user alert means have not been shown in this figure. A passive ferromagnetic detection means (910) is arranged to measure an ambient magnetic field within ferromagnetic detection zone (911), the zone at least covering a portion of the access road (960). The ferromagnetic detection means (910), produces a measurement signal in response to the change in ambient magnetic field caused by the movement of a vehicle through the detection zone (911). The measurement signal is provided to ferromagnetic assessment means. The ferromagnetic assessment means identifies the temporal variations in the measurement signal and provides a ferromagnetic assessment output to an end-user alert means. Concurrently, a visitor/intruder register means (920) is arranged to register a visitor/intruder in an object detection zone (921), which also covers the same access road (960). In this embodiment, the ferromagnetic detection zone (911) and object detection zone (921) overlap, the area of overlap defining a concurrent detection zone. The visitor/intruder register means produces a register signal in response to the movement of a vehicle (not shown) registered in the object detection zone (921). The register signal is provided to a register assessment means. The register assessment means identifies the temporal variations in the register signal and provides a visitor/intruder assessment output to end-user alert means. In the embodiment, the end-user alert means (not shown) is a program/app hosted on a mobile device, and is connected to the ferromagnetic assessment means and register assessment means by a wireless connection over a cellphone network.

The end-user alert means raises an alert in response to the detection of a target-sized or larger ferromagnetic object (i.e. a vehicle) in the ferromagnetic detection zone (911) with the presence of a visitor/intruder (the vehicle) being registered concurrently in the object detection zone (921). In this embodiment, the ferromagnetic detection means (910), ferromagnetic assessment means, visitor/intruder register means (920) and register assessment means are formed of a single integral unit adapted for outdoor use.

In a separate but related embodiment, the visitor/intruder register means (920) and associated parts like the register assessment means (921) are not required (or are disabled). In this embodiment, the end-user alert means raises a precautionary alert in response to the detection of a target-sized or larger ferromagnetic object (e.g. a vehicle) in the ferromagnetic detection zone (911), and is not reliant on concurrent object detection by a visitor/intruder register means.

Figure 10:
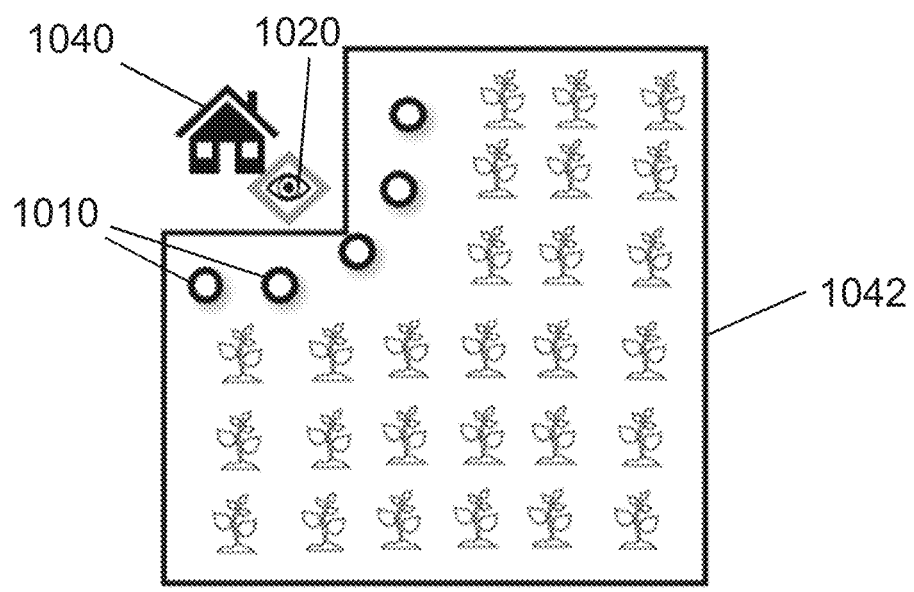
FIG. 10 shows a schematic representation of an embodiment of the invention policing entry points to a farm building adjacent to a field of crops.

FIG. 10 is a similar arrangement to that described in FIG. 7, except in this embodiment (10) a farm building (1040) is being protected and covered by an extended ferromagnetic detection zone and an object detection zone (not shown for simplicity). In this embodiment, the group of ferromagnetic detection means (1010) providing the extended ferromagnetic detection zone, may be tuned to send a threat output when ferromagnetic objects associated with human activity are sensed approaching from the field of crops (1042) towards the building (1040). Alternatively, the ferromagnetic detection means (1010) may be tuned to send a threat output only when a threat-sized object (e.g. rifle) or larger is detected. In the embodiment, the visitor/intruder register means (1020) is a bank of CCTV cameras which are set to watch over the field of crops (1042) from various angles.

In a separate but related embodiment, the visitor/intruder register means (1020) and associated parts like the register assessment means are not required (or are disabled). In this embodiment, the end-user alert means raises a precautionary alert in response to the detection of a ferromagnetic object associated with human activity in the extended ferromagnetic detection zone (e.g. cellphone and/or keys etc.), or set to look for threat-sized objects, like guns; and so is not reliant on concurrent object detection by a visitor/intruder register means.

Figure 11:
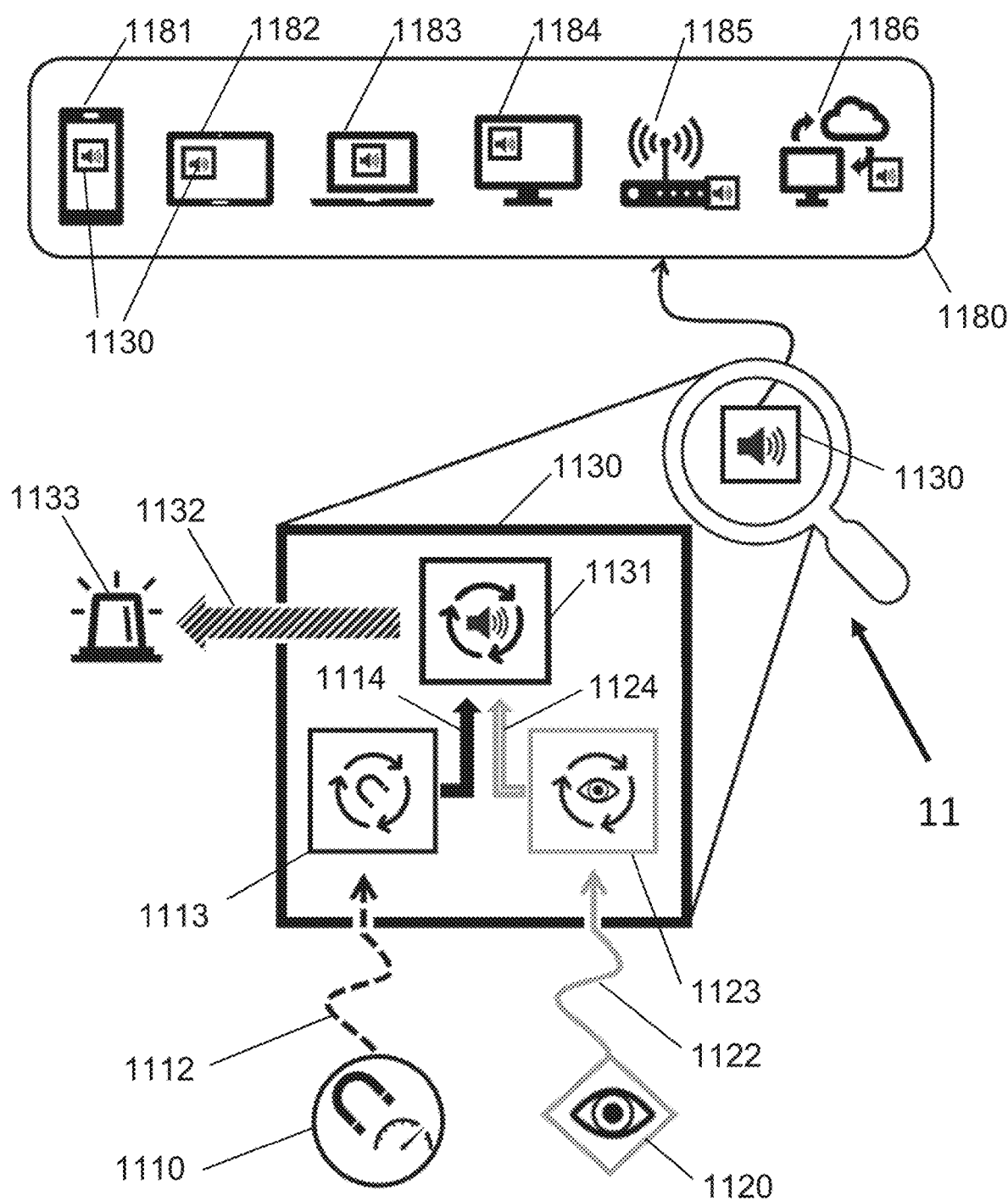
FIG. 11 shows a schematic representation of an embodiment of the end-user alert means housed on a remote, portable and/or personal device.

FIG. 11 shows an embodiment of the end-user alert means of the invention (11). The end-user alert means (1130) is located on a device (1180), the device inclusive of any one of cellphone (1181), notepad (1182), laptop (1183), monitor (1184), router (1185), cloud-based server (1186). In the embodiment, the end-user alert means comprises the ferromagnetic assessment means (1113) and register assessment means (1123). These being arranged to respectively receive and process the measurement signal (1112) and register signal (1122) and to give a respective ferromagnetic assessment output (1114) and a visitor/intruder assessment output (1124). The end-user alert means (1130) also comprises a threat assessment means (1131) configured to receive the ferromagnetic assessment output (1114) and visitor/intruder assessment output (1124) and to give a threat assessment output (1132). The threat assessment output (1132) triggering an alert/warning/alarm (1133). In an embodiment where the end-user means (1130) is an app/program, the ferromagnetic assessment means (1113), register assessment means (1123) and threat assessment means (1131) are algorithms/programs running within an app/program hosted on any one of a cellphone (1181), notepad (1182), laptop (1183), monitor (1184), router (1185), cloud-based server (1186). In an embodiment where the end-user means (1130) is hardware, the ferromagnetic assessment means (1113) and register assessment means (1123) are logic circuits on a circuit board located in any one of a cellphone (1181), notepad (1182), laptop (1183), monitor (1184), router (1185) and cloud-based server (1186).

Figure 12:
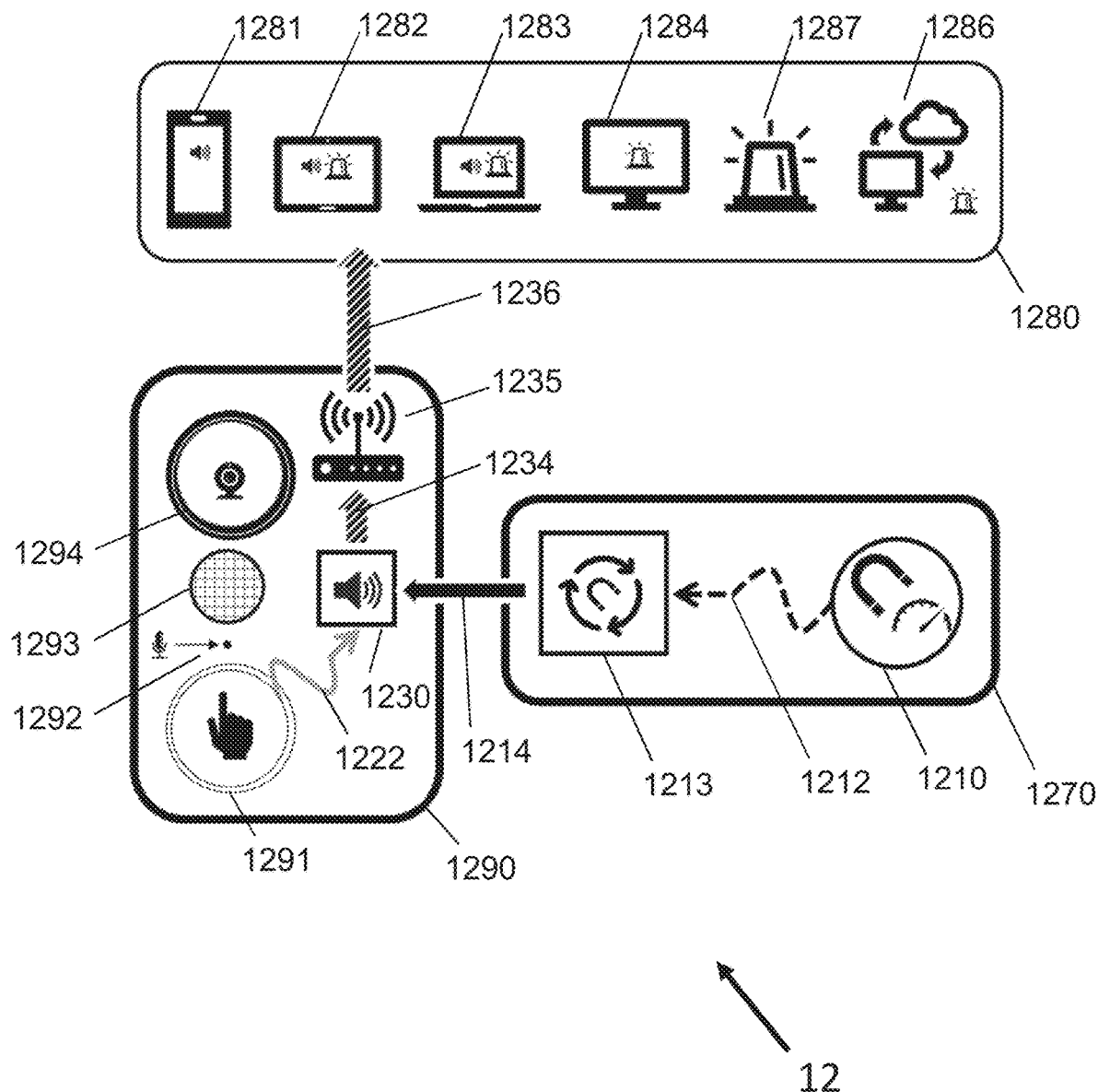
FIG. 12 shows a schematic representation of an embodiment of the invention employing a smart doorbell in combination with a modular ferromagnetic detection unit and connected to a remote, portable and/or personal end-user device.

FIG. 12 shows a schematic representation of an embodiment of the security system of the invention (12). Ferromagnetic detection module (1270) comprises the ferromagnetic detection means (1210) and ferromagnetic assessment means (1213). The module (1270) being wirelessly linked to an IoT smart doorbell (1290). The smart doorbell (1290) comprises press button (1291), end-user alert means (1230), microphone (1292), speaker (1293), camera (1294) and a wireless communication unit (1235). The smart doorbell (1290) communicating wirelessly (1236) with an end-user device (1280), which can take the form of any one of cellphone (1281), notepad (1282), laptop (1283), monitor (1184), alarm (1287) and device linked to cloud-based server (1286). In this embodiment, the ferromagnetic detection module (1270) is responsible for detecting ferromagnetic objects moving in its respective ferromagnetic detection zone (measurement signals (1212) being sent to and processed by the ferromagnetic assessment means (1213)), and providing the ferromagnetic assessment output (1214) to the end-user alert means (1230). When a visitor/intruder presses the doorbell button (1291) of the smart doorbell (1290), the visitor/intruder presence is registered, with a register signal (1222) being provided to the register assessment means (not shown) forming part of the end-user alert means (1230). The end-user alert means (1230) is configured to receive the ferromagnetic assessment output (1214) and visitor/intruder assessment output and give a threat assessment output (1234). The threat assessment output (1234) triggering an alert/warning/alarm on the connected end-user device (1280). In the embodiment shown, the ferromagnetic assessment means (1213) and register assessment means, and the end-user alert means (1230) are logic circuits on a circuit board. In the embodiment shown, the threat assessment output (1234) is transmitted to an end-user device (1280) via a wireless alert signal (1236), and an alert/warning/alarm is displayed by the device: on the cellphone (1181) this is displayed as an audible alert; on the notepad (1182) and laptop (1183) this is displayed as an audible and visual alert; on the monitor (1184) and monitor linked to a cloud-based server the alert is displayed as a visual alert; with the alarm (1287) an alarm hub is activated. It is also considered that other ways of presenting the alert/warning/alarm may be configured on the associated device (1280).

EXAMPLES

Some non-limiting examples in which embodiments of the invention may be used are given below:

Example 1—Screening for Threats at a Dwelling Entrance

A visitor rings a smart doorbell of a domestic dwelling, thereby registering their presence at the front door. At that time, the passive ferromagnetic detection means of the invention indicates that the person has an unusually high ferromagnetic load.

In a first scenario, the person is the homeowner's plumber equipped with their bag of tools, and who has come to make a scheduled repair. The homeowner determines that it is reasonable for the workman to have their bag of metal tools and so grants them entry. In a second scenario, the visitor is a criminal carrying a concealed weapon and claims to be delivering a registered letter for a neighbor who is currently not in. The unannounced visitor appears to have no reason for their unusually high ferromagnetic signature. The homeowner may seek to corroborate the visitor's story by asking them questions over the intercom system built into their smart doorbell, or simply deny them entry. If the smart doorbell has a camera, the homeowner has the ability to view the visitor to see if they can gain further information about the visitor. Overall, the homeowner is empowered to make an informed security decision about the potential threat of the visitor. Of course, the invention is not limited to the screening of 'unknown visitors', but could be used to screen visitors known to the homeowner, such as a former tenant, ex-partner, family member, work colleague or acquaintance. It is an unfortunate fact that many people are hurt or killed in their homes by people who are not strangers.

Example 2—Back Area of a Warehouse

A warehouse is monitored by a bank of external CCTV cameras. One of the cameras registers the presence of a visitor near the backdoor of the warehouse, and the nearby passive ferromagnetic detection means also indicates that the visitor is carrying an unusually high ferromagnetic load. The end-user alert means draws the attention of a CCTV operator to view this camera's live video stream. In a first scenario, the visitor is an armed security guard simply patrolling the area, and so the CCTV operator can stand-down the alert. In a second scenario, it is clear that the visitor has no reason to be at the backdoor of the premises and is acting suspiciously. The CCTV operator then enacts an appropriate security response.

Example 3—Screening for Human Activity

A ground floor window is located at the side of a house and has no paths leading to it, the window is policed by an embodiment of the invention. In a first scenario, the windowsill is visited by a cat wearing an identification collar. A false positive is not triggered by the embodiment of the invention. This is because the alert threshold of the passive ferromagnetic detection means is set/tuned to ignore small amounts of ferromagnetic material (e.g. the pet's collar). As such, the invention has the capability of ignoring this nonhuman activity. In a second scenario, an opportunist thief approaches the window and an alert is triggered by the embodiment of the invention. This is because, the passive ferromagnetic detection means is set/tuned to respond to a person carrying a typical/normal ferromagnetic load (e.g. cellphone and/or set of keys etc.). A greater load would also trigger the alert. A burglar or home invader is likely to be carrying items like a crowbar or weapon. As such, this remote access point of the location to be protected is protected against human activity, but is capable of ignoring nonhuman activity.

Example 4—Screening Access Roads Leading to Buildings

A cattle ranch has several outbuildings that store heavy equipment like farm machinery and vehicles like tractors. There are several roads that give access to the ranch. The passive ferromagnetic detection means of the invention is set up to police areas along the access road. When the passive ferromagnetic detection means indicates that a large ferromagnetic object (e.g. a vehicle) has passed the policed area, the end-user alert means triggers a warning on the rancher's cellphone. In a first scenario, the rancher is not expecting vehicular movement at that time of day, and so enacts a security protocol to thwart the would-be cattle rustlers. In a second scenario, the rancher knows a farmhand is moving equipment about. Using a video capture and storage system, the rancher is also able to review the footage of the vehicle and determine that the movement is a legitimate ranch-related activity.

Example 5—Screening for the Movement of Large Equipment or Vehicles

Farm vehicles are stored in a remote storage area, and the area is policed by an embodiment of the invention. In a first scenario, a vehicle thief has gain entry to a farmer's outbuilding and is trying to drive a tractor out of this storage shed to steal it. This unexpected movement of a large ferromagnetic object triggers an alert. In a second scenario, the movement of a farmhand (or animals like bats, owls or vermin) in and out of the outbuilding does not trigger the same alert. This is because the passive ferromagnetic detection means has been de-tuned so as to only trigger when large ferromagnetic objects, like vehicles, are moving in the area being screened.

The invention claimed is:
1. A security system, comprising:
(i) a passive ferromagnetic detector arranged to measure an ambient magnetic field within a ferromagnetic detection zone and to produce a measurement signal;
(ii) a ferromagnetic assessor arranged in communication with the passive ferromagnetic detector and configured to receive the measurement signal and configured to identify temporal variations in the measurement signals and to produce a ferromagnetic assessment output;
(iii) an end-user alerter arranged in communication with the ferromagnetic assessor and configured to receive the ferromagnetic assessment output;
(iv) a visitor/intruder registrar arranged to register the presence of a visitor/intruder in an object detection zone and to produce a register signal; and
(v) a register assessor arranged in communication with the visitor/intruder registrar and configured to receive the register signal and to process the register signal and to produce a visitor/intruder assessment output, wherein the end-user alerter is arranged in communication with the register assessor and is configured to receive the visitor/intruder assessment output; and wherein in use, the end-user alerter is configured to raise an alert when the ferromagnetic assessment output indicates the presence of a target-sized or larger ferromagnetic object in the ferromagnetic detection zone and the visitor/intruder assessment output indicates the presence of a visitor/intruder in the object detection zone.

2. The security system according to claim 1, wherein a remote, portable and/or personal device comprises the end-user alerter.

3. The security system according to claim 1, wherein the passive ferromagnetic detector and/or visitor/intruder registrar are located on; proximate to, or adjacent to, the entry point of the location to be secured.

4. The security system according to claim 3, wherein the personal device is wirelessly connected to the security system.

5. The security system according to claim 1, wherein the location to be secured is selected from a domestic home, gated community, outbuilding, room, door, doorway, archway, gate, window, garage, farm, farm building, farm outbuilding, animal enclosure, hanger, wall housing an ATM, industrial building or complex of buildings.

6. The security system according to claim 1, wherein the passive ferromagnetic detector and/or visitor/intruder registrar are concealed outdoors.

7. The security system according to claim 1, wherein the target-sized or larger ferromagnetic object is selected from any one of: an object about the size of a knife, handgun, rifle, suicide bomb vest, motorbike, car, excavator, tractor and farm machinery.

8. The security system according to claim 1, wherein the passive ferromagnetic sensors are selected from any one of amorphous magneto-resistive magnetometer, fluxgate sensor, magneto-resistive sensor, magneto-impedance sensor, Hall Effect sensor, and galvanic coil sensor.

9. The security system according to claim 1, wherein the visitor/intruder registrar comprises one or more of a doorbell, smart doorbell, camera, CCTV, IFD, PIR, movement sensor, window lock, window switch, door lock, door switch, shock sensor, vibration sensor and pressure sensor.

10. The security system according to claim 1, wherein the ferromagnetic assessor, register assessor, and/or end-user alerter are wirelessly connected to the security system.

11. The security system according to claim 1, wherein the end-user alerter is configured in use to warn an end-user within the location to be secured, and/or another person remotely located.

12. The security system according to claim 1, wherein the alert is audible, visual, vibrational and/or haptic.

13. The security system according to claim 1, wherein the end-user alerter activates or accesses a further security device such as camera, CCTV, floodlight, microphone and/or speaker.

14. The security system according to claim 1, wherein the security system comprises modular parts (i) to (v), or modular parts comprising units of parts (i) to (iv), the modular parts configured to be readily integrated into or out of the security system.

15. The security system according to claim 1, wherein the security system, or parts thereof, are mains powered, battery powered and/or powered by a renewable power source.

16. The security system according to claim 1, wherein the security system is configured to be temporarily deactivated.

17. The security system according to claim 1, wherein the security system comprises a memory, or is configured to have access to a memory.

18. A method of protecting an entry point of a location to be secured, comprising the steps of:
  (a) measuring an ambient magnetic field or its gradient in a ferromagnetic detection zone using a passive ferromagnetic detector comprising at least one magnetic sensor, and producing a corresponding measurement signal, wherein the ferromagnetic detection zone is arranged to cover the entry point of a location to be secured, or is arranged to be proximate, or adjacent to, the entry point of the location to be secured;
  (b) registering a visitor/intruder using a visitor/intruder registrar adapted to register the presence of a visitor/intruder within an object detection zone, and producing a corresponding register signal, wherein the object detection zone is arranged to cover the entry point of the location to be secured, or is arranged to be proximate, or adjacent to, or on, the entry point of the location to be secured;
  (c) identifying temporal variations in the measurement signal produced by the passive ferromagnetic detector due to the movement of a ferromagnetic object within the ferromagnetic detection zone and providing a ferromagnetic assessment output to an end-user alerter;
  (d) assessing the register signal for the presence of a visitor/intruder in the object detection zone and providing a visitor/intruder assessment output to the end-user means; and
  (e) assessing the ferromagnetic assessment output and the visitor/intruder assessment output using the end-user alerter, and raising an alert when the ferromagnetic assessment output indicates the presence of a target-sized or larger ferromagnetic object within the ferromagnetic detection zone, and concurrently the object assessment output indicates the presence of a visitor/intruder in the object detection zone.

19. A method of protecting a window or a non-conventional entry point of a location to be secured, comprising the steps of:
  (a) measuring an ambient magnetic field or its gradient in a ferromagnetic detection zone using a passive ferromagnetic detector comprising at least one magnetic sensor, and producing a corresponding measurement signal, wherein the ferromagnetic detection zone is arranged to cover the window or a non-conventional entry point of a location to be secured, or is arranged to be proximate, or adjacent to, the window or a non-conventional entry point of the location to be secured;
  (b) registering a visitor/intruder using a visitor/intruder registrar adapted to register the presence of a visitor/intruder within an object detection zone, and producing a corresponding register signal, wherein the object detection zone is arranged to cover the window or a non-conventional entry point of the location to be secured, or is arranged to be proximate, or adjacent to, or on, the window or a non-conventional entry point of the location to be secured;
  (c) identifying temporal variations in the measurement signal produced by the passive ferromagnetic detector due to the movement of a ferromagnetic object within the ferromagnetic detection zone and providing a ferromagnetic assessment output to an end-user alerter;

(d) assessing the register signal for the presence of a visitor/intruder in the object detection zone and providing a visitor/intruder assessment output to the end-user means; and (e) assessing the ferromagnetic assessment output and the visitor/intruder assessment output using the end-user alerter, and raising an alert when the ferromagnetic assessment output indicates the presence of a target-sized or larger ferromagnetic object within the ferromagnetic detection zone, and concurrently the object assessment output indicates the presence of a visitor/intruder in the object detection zone, and wherein the target-sized object corresponds to a human with a typical ferromagnetic load, such as a human carrying a cellphone and/or a set of keys.

* * * * *